United States Patent
Wang

(10) Patent No.: US 9,294,777 B2
(45) Date of Patent: Mar. 22, 2016

(54) PROGRESSIVE REFINEMENT WITH TEMPORAL SCALABILITY SUPPORT IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 14/040,014

(22) Filed: Sep. 27, 2013

(65) Prior Publication Data

US 2014/0185670 A1  Jul. 3, 2014

Related U.S. Application Data

(60) Provisional application No. 61/747,347, filed on Dec. 30, 2012.

(51) Int. Cl.
*H04N 19/31* (2014.01)
*H04N 19/50* (2014.01)
*H04N 19/70* (2014.01)

(52) U.S. Cl.
CPC .............. *H04N 19/31* (2014.11); *H04N 19/50* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 2006/0256851 A1* | 11/2006 | Wang et al. | ............... | 375/240.01 |
| 2007/0183494 A1* | 8/2007 | Hannuksela | ............... | 375/240.1 |
| 2007/0223595 A1* | 9/2007 | Hannuksela et al. | ..... | 375/240.26 |
| 2008/0013621 A1* | 1/2008 | Wang et al. | ............... | 375/240.01 |
| 2008/0260047 A1* | 10/2008 | Hannuksela et al. | ..... | 375/240.27 |
| 2009/0080535 A1* | 3/2009 | Yin et al. | ................. | 375/240.26 |

FOREIGN PATENT DOCUMENTS

WO   2007080223 A1   7/2007

OTHER PUBLICATIONS

Kazui et al., "AHG9: Modification of SEIs Specified in AVC," ITU-T Document JCTVC-K0142, Oct. 1, 2012, pp. 1-21.*
Sun et al., "Scalable Coding Solutions Based on Various Sub Sequence Structures," ITU-T Document JVT-U156, Oct. 20, 2006, pp. 1-11.*
Bross, B., et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29NVG11, 12th Meeting: Geneva, CH, Jan. 14-23, 2013, Document JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.

(Continued)

*Primary Examiner* — Jay Patel
*Assistant Examiner* — Reza Aghevli
(74) *Attorney, Agent, or Firm* — Shumaker & Sieffert, P.A.

(57) ABSTRACT

An example method of decoding video data includes receiving information indicating a picture order count (POC) value of a last picture of a plurality of pictures in a progressive refinement segment in an encoded bitstream, and decoding at least some of the pictures in the progressive refinement segment according to a progressive refinement operation based on the received information.

29 Claims, 6 Drawing Sheets

(56) References Cited

OTHER PUBLICATIONS

Bross et al., "High efficiency video coding (HEVC) text specification draft 8," 10th Meeting: Stockholm, SE, Jul. 11-20, 2012, JCTVC-J1003_d7, 261 pp.
Bross et al., "High Efficiency Video Coding (HEVC) text specification draft 9," 11th Meeting: Shanghai, CN, Oct. 10-19, 2012, Document: JCTVC-K1003_v8, 292 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High Efficiency Video Coding (HEVC) text specification draft 9," 11th Meeting: Shanghai, CN, Document No. JCTVC-K1003_v13, Oct. 10-19, 2012, 317 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
International Search Report and Written Opinion—PCT/US2013/075421—ISA/EPO—Mar. 28, 2014, 12 pp.
ITU-T H.261, Line Transmission of Non-Telephone Signals, Video Codec for Audiovisual Services At p=64 kbits, The International Telecommunication Union, Mar. 1993, 29 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.
ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Kazui et al., "AHG9: Modification of SEIs specified in AVC," JCT-VC Meeting; MPEG Meeting; Shanghai; (Joint Collaborative Team on Video Coding of ISO/IEC JTC1/SC29/WG11 and ITU-T SG.16); URL: http://wftp3.itu.int/av-arch/jctvc-site/,, No. Document JCTVC-K0142, Oct. 10-19, 2012, 21 pp.
Sun et al., "Scalable Coding Solutions Based on Various Sub Sequence Structures," JVT Meeting; MPEG Meeting; Hangzhou, CN; (Joint Video Team of ISO/IEC JTC1/SC29/WG11 and ITU-T SG.16 ),, No. Document JVT-U156, Oct. 20-27, 2006, 11 pp.
Wang et al., "AHG9: HEVC SEI messages cleanups," JCT-VC Meeting; MPEG Meeting; (Joint Collaborative Team on Video Coding of ISO/IEC JTC1/SC29/WG11 and ITU-T SG.16 ); URL: http://wftp3.itu.int/av-arch/jctvc-site/, No. Document JCTVC-L0045v1, Jan. 14-23, 2013, 5 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Second Written Opinion of the Preliminary Searching Authority—PCT/US2013/075421—IPEA—Oct. 20, 2014, 6 pp.
International Preliminary Report on Patentability from International Appln. No. PCT/US2013/075421 mailed May 8, 2015, 20 pp.

\* cited by examiner

PROGRESSIVE REFINEMENT WITH TEMPORAL SCALABILITY SUPPORT IN VIDEO CODING

This application claims the benefit of U.S. Provisional Application No. 61/747,347, filed Dec. 30, 2012, the entire contents of which are incorporated herein by reference.

TECHNICAL FIELD

This disclosure relates to video coding and, more particularly, techniques for progressive refinement of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve more compression.

SUMMARY

In general, this disclosure describes techniques for progressive refinement of video data in video bitstreams with temporal scalability.

In one example, a method of decoding video data includes receiving information indicating a picture order count (POC) value of a last picture of a plurality of pictures in a progressive refinement segment in an encoded bitstream, and decoding at least some of the pictures in the progressive refinement segment according to a progressive refinement operation based on the received information.

In another example, a method of encoding video data includes encoding at least some pictures of a plurality of pictures in a progressive refinement segment according to a progressive refinement operation, and generating information indicating a picture order count (POC) value of a last picture of the progressive refinement segment in an encoded bitstream.

In another example, a device for coding video data includes a video coder configured to determine information indicating a picture order count (POC) value of a last picture of a plurality of pictures in a progressive refinement segment in an encoded bitstream, and code at least some of the pictures in the progressive refinement segment according to a progressive refinement operation.

In another example, a computer-readable storage medium has stored thereon instructions that, when executed, cause a programmable processor of a computing device to determine information indicating a picture order count (POC) value of a last picture of a plurality of pictures in a progressive refinement segment in an encoded bitstream, and code at least some of the pictures in the progressive refinement segment according to a progressive refinement operation.

In another example, a device for coding video data includes means for determining information indicating a picture order count (POC) value of a last picture of a plurality of pictures in a progressive refinement segment in an encoded bitstream, and means for coding at least some of the pictures in the progressive refinement segment according to a progressive refinement operation.

The details of one or more examples are set forth in the accompanying drawings and the description below. Other features, objects, and advantages will be apparent from the description and drawings, and from the claims.

DETAILED DESCRIPTION

Figure 1:
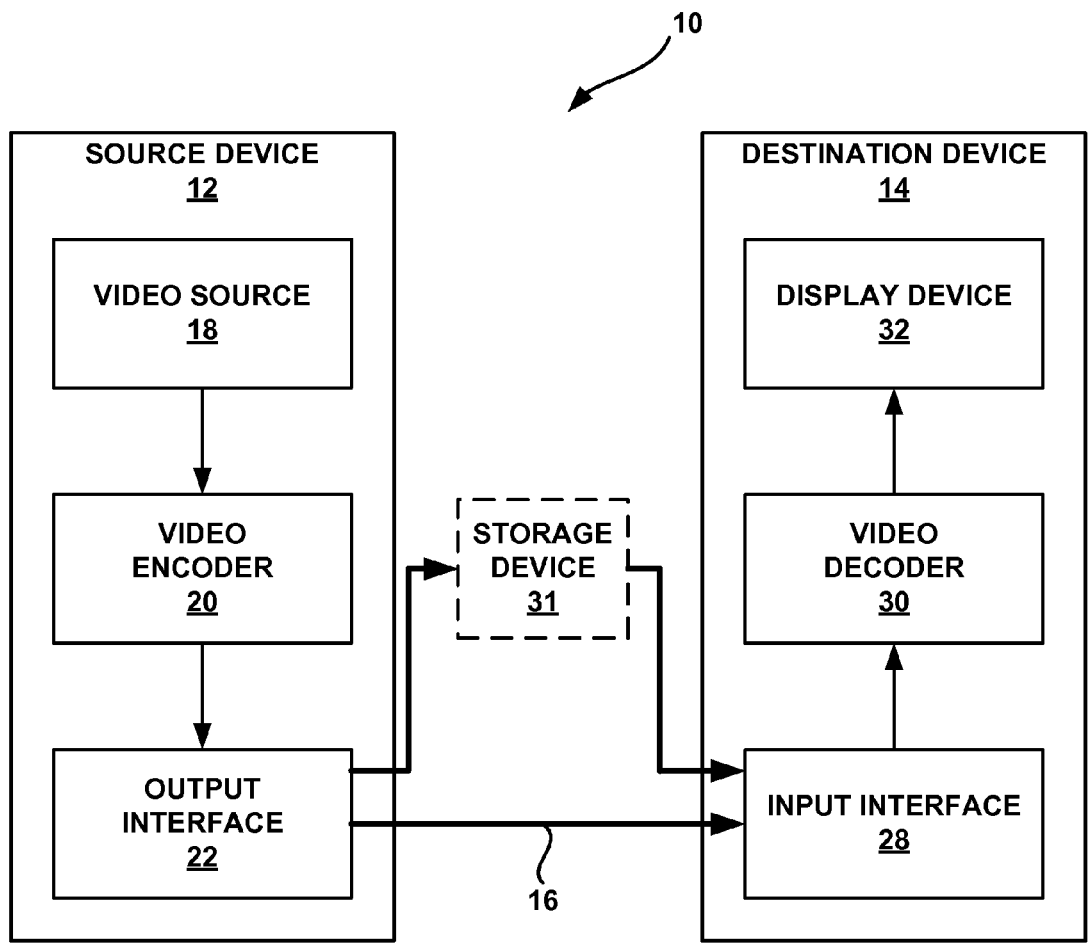
FIG. 1 is a block diagram illustrating an example video encoding and decoding system that may implement one or more techniques described in this disclosure.

In general, techniques of this disclosure are directed to coding video data using progressive refinement, while supporting temporal scalability of the coded video data. According to various examples of this disclosure, a video coding device may use messages provided by the supplemental enhancement information (SEI) mechanism supported by both the AVC and HEVC standards, to enable progressive refinement while supporting temporal scalability. In this manner, the techniques of this disclosure may offer the potential advantage of enabling video coding devices to leverage existing hardware, software, and communication infrastructures, while enhancing progressive refinement-based coding to support temporal scalability.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of Jun. 6, 2013, is downloadable from: http://phenix.int-evry.fr/jct/doc_end_user/documents/12_Geneva/wg11/JCTVC-L1003-v34.zip. The entire content of WD10 is hereby incorporated by reference. The AVC (ITU-T) H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Another recent Working Draft (WD) of HEVC, and referred to as HEVC WD9 hereinafter, is available from http://phenix.int-evry.fr/jct/doc_end_user/documents/11_Shanghai/wg11/JCT-VC-K1003-v8.zip. The entire contents of HEVC WD9 (BROSS et al., "High efficiency video coding (HEVC) text specification draft 9," Document JCTVC-K1003_v7, 11th Meeting: Shanghai, CN, 10-19 Oct. 2012, 290 pp.) are incorporated herein by reference.

Both of the AVC and HEVC standards support coding of video data using progressive refinement. Progressive refinement may enable a device to code a set of pictures, such as a sequence or series of pictures arranged in decoding order. Such a sequence of pictures is referred to herein as a "progressive refinement segment." The progressive refinement segment may include two or more encoded pictures that each represents a refined version of a particular picture (e.g., a "base picture"). The picture may be refined in terms of quality or other characteristics such as spatial format. In general, no encoded picture of the progressive refinement segment may be predicted from the base picture using motion-based prediction. A video coding device may determine the bounds of the progressive refinement segment using particular SEI messages, such as "progressive refinement segment start" and "progressive refinement segment end" SEI messages.

Additionally, both the AVC and HEVC standards support temporal scalability of video bitstreams. Temporal scalability may enable a video coding device to determine that a subset of encoded video data may be extracted from a full bitstream of encoded video data. Such a subset of encoded video data (e.g., encoded pictures), extracted from a full bitstream in accordance with temporal scalability, may be referred to as a "temporal subset." In turn, temporal scalability as supported by the AVC and HEVC standards may enable a video coding device to determine multiple temporal subsets from a full bitstream, such that the various temporal subsets include varying numbers of encoded pictures. A lower, or "coarser" temporal subset may include a lesser number of encoded pictures from the full bitstream, and may represent a lower picture rate or frame rate. Conversely, a higher, or "finer" temporal subset may include a greater number of encoded pictures from the full bitstream, and may represent a higher picture rate or frame rate.

Video coding devices configured to apply existing implementations of progressive refinement-based coding to temporally scalable bitstreams may encounter, or present, one or more potential inaccuracies with respect to the progressive refinement segment. For instance, according to existing implementations of progressive refinement, a syntax element included in the progressive refinement segment start SEI message may indicate a number of consecutive encoded pictures that form the progressive refinement segment.

Consequently, in instances where a temporal subset is signaled, the number of consecutive encoded pictures in the progressive refinement segment, as indicated by the syntax element of the SEI message, may be inaccurate. More specifically, as the temporal subset represents a smaller number of encoded pictures than the full bitstream, one or more encoded pictures of the original progressive refinement segment may be absent. However, the syntax element indicating the number of pictures in the progressive refinement segment may not be dynamically updated to reflect the reduced number of encoded pictures in the corresponding progressive refinement segment of the extracted temporal subset. Accordingly, there may be a mismatch between the number of consecutive encoded pictures forming the progressive refinement segment for the bitstream, and the number of consecutive encoded pictures in a corresponding segment of a temporal subset of that bitstream.

To alleviate or potentially eliminate such inaccuracies of progressive refinement-based coding with respect to temporally scalable bitstreams, the techniques of this disclosure may enable a video coding device to determine the bounds of a progressive refinement segment using information indicating a picture order count (POC) value of the last encoded picture of the progressive refinement segment. For instance, each encoded picture of the progressive refinement segment may be associated with a static POC value. As a result, the information (e.g., a syntax element) may provide an accurate identification of the last encoded picture of the segment, regardless of whether the segment is included in a temporal subset of a full bitstream. In one implementation of the techniques, the information may indicate a difference between the respective POC values (or "delta_POC") of the base picture and the last encoded picture of the progressive refinement segment. According to another implementation of the techniques, the information may indicate a difference between the respective least significant bits (LSBs) of the respective POC values of the base picture and the last encoded picture of the progressive refinement segment.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 31. Similarly, encoded data may be accessed from storage device 31 by input interface. Storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 may correspond to a file server or another intermediate storage device that may hold the encoded video generated by source device 12. Destination device 14 may access stored video data from storage device 31 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 31 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 31 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU may include a luma coding block and two chroma coding blocks. The CU may have associated prediction units (PUs) and transform units (TUs). Each of the PUs may include one luma prediction block and two chroma prediction blocks, and each of the TUs may include one luma transform block and two chroma transform blocks. Each of the coding blocks may be partitioned into one or more prediction blocks that comprise blocks to samples to which the same prediction applies. Each of the coding blocks may also be partitioned in one or more transform blocks that comprise blocks of sample on which the same transform is applied.

A size of the CU generally corresponds to a size of the coding node and is typically square in shape. The size of the CU may range from 8×8 pixels up to the size of the treeblock with a maximum of 64×64 pixels or greater. Each CU may define one or more PUs and one or more TUs. Syntax data included in a CU may describe, for example, partitioning of the coding block into one or more prediction blocks. Partitioning modes may differ between whether the CU is skip or direct mode encoded, intra-prediction mode encoded, or inter-prediction mode encoded. Prediction blocks may be partitioned to be square or non-square in shape. Syntax data included in a CU may also describe, for example, partitioning of the coding block into one or more transform blocks according to a quadtree. Transform blocks may be partitioned to be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may represent the TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

One or both of video encoder 20 and video decoder 30 may implement techniques of this disclosure to code video data using progressive refinement, while supporting temporally scalable bitstreams. Video encoder 20 may be configured or otherwise operable to encode a series or sequence of pictures to form a progressive refinement segment. In turn, video encoder 20 may signal the progressive refinement segment, as part of an encoded video bitstream, to video decoder 30.

One or both of video encoder 20 and video decoder 30 may identify the progressive refinement segment as a sequence of pictures that immediately follows a base picture in decoding order. To identify the progressive refinement segment, video encoder 20 and/or video decoder 30 may determine that a progressive refinement segment start SEI message immediately follows the base picture. Additionally, no picture of the progressive refinement segment is predicted from the base picture, directly or indirectly, using motion information. In some examples, each picture of the progressive refinement segment represents a defined, incremental quality refinement over the preceding picture of the progressive refinement sequence.

For instance, the first picture of the progressive refinement segment may represent a quality refinement of a defined increment in comparison to the base picture. In turn, the second picture of the progressive refinement segment may represent a quality refinement of a defined increment, with respect to the first picture of the progressive refinement segment. In various examples, the defined increments may remain the same throughout the progressive refinement segment, or may vary at different picture transitions within the progressive refinement segment. In this manner, the progressive refinement segment, taken as a whole, may represent a consistent series of quality refinements over the base picture.

Video encoder 20 may encode the base picture, and in turn, may encode the progressive refinement segment by applying the incremental quality refinement to the encoded picture that immediately precedes each picture of the progressive refinement segment. Additionally, video encoder 20 may signal the bounds of the progressive refinement segment using one or more supplemental enhancement information (SEI) messages. For instance, video encoder 20 may signal the starting bound of the progressive refinement segment using a "progressive refinement segment start" SEI message, e.g., immediately before the first picture in the progressive refinement segment. Similarly, video encoder 20 may signal the ending bound of the progressive refinement segment using a "progressive refinement segment end" SEI message, e.g., immediately following the last picture in the progressive refinement segment. An overview of SEI messages, as supported in an HEVC working draft (e.g., "WD9") is illustrated in Table 1 below.

TABLE 1

Overview of SEI Messages

| SEI message | Purpose |
| --- | --- |
| Buffering period | Initial delays for hypothetical reference decoder (HRD) operation |
| Picture timing | Picture output time and picture/sub-picture removal time for HRD operation, as well as picture structure related information |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Structure of pictures description | Describes the temporal and inter prediction structure of the bitstream |

TABLE 1-continued

Overview of SEI Messages

| SEI message | Purpose |
|---|---|
| Decoded picture hash | Checksum of the decoded picture, which may be used for error detection |
| Active parameter sets | Provides information on of active VPS, SPS, etc. |
| Decoding unit information | Sub-picture removal time for HRD operation, as well as decoding unit index |
| Temporal level zero index | Provides temporal level zero index values |
| Scalable nesting | Provides a mechanism to nest SEI messages for association to different operation points and layers |
| Region refresh information | Provides information on refreshed and non-refreshed region for gradual decoding refresh |

Syntax and semantics for the progressive refinement segment start SEI message, as supported in HEVC WD9, are illustrated in syntax table 1 below.

SYNTAX TABLE 1

| progressive_refinement_segment_start( payloadSize ) { | Descriptor |
|---|---|
|     progressive_refinement_id | ue(v) |
|     num_refinement_steps_minus1 | ue(v) |
| } | |

As described, video encoder 20 may encode the progressive refinement segment start SEI message to specify the beginning of the progressive refinement segment. Correspondingly, video decoder 30 may, while decoding a received encoded video bitstream, decode the progressive refinement segment start SEI message, and determine the beginning of the encoded progressive refinement segment, e.g., to identify the first picture in the encoded progressive refinement segment. Based on video encoder 20 signaling the set of consecutive pictures in the progressive refinement segment according to decoding order, video decoder 30 may decode the progressive refinement segment in signaled order. Additionally, in some examples, video encoder 20 may generate and signal the progressive refinement segment as a set of consecutive encoded pictures in output order. In these examples, video decoder 30 may also decode the progressive refinement segment in output order.

The "progressive_refinement_id" syntax element included in the progressive refinement segment start SEI message may identify the progressive refinement operation that defines the incremental quality refinement between consecutive pictures of the progressive refinement segment. For instance, video encoder 20 may set the value of the progressive_refinement_id syntax element within a numerical range starting at 0 and ending at (2^32−2), both values inclusive. More specifically, video encoder 20 may set the value of the progressive_refinement_id syntax element to indicate a particular progressive refinement operation that defines the incremental quality refinement between consecutive pictures of the progressive refinement segment.

In turn, video decoder 30 may decode the progressive refinement segment start SEI message, to obtain the signaled value of the progressive_refinement_id syntax element. Additionally, video decoder 30 may use the value of the progressive_refinement_id syntax element to determine the progressive refinement operation to apply to the signaled encoded base picture to decode the first encoded picture of the progressive refinement segment.

Similarly, video decoder 30 may apply the progressive refinement operation indicated by the progressive_refinement_id syntax element to each picture of the progressive refinement segment, except for the last picture of the progressive refinement segment. In other words, video decoder 30 may iteratively apply the operation identified by the value of the progressive_refinement_id syntax element, beginning with the first picture of the progressive refinement segment, and ending at the penultimate picture of the progressive refinement segment. More specifically, by applying the refinement operation identified by the value of the progressive_refinement_id syntax element to the encoded base picture and each of the first to the penultimate encoded picture of the progressive refinement segment, video decoder 30 may decode the entire progressive refinement segment.

Additionally, in encoding the progressive refinement segment start SEI message, video encoder 20 may set the value of the num_refinement_steps_minus1 syntax element to indicate the number of encoded pictures included in the tagged set of encoded pictures that make up the progressive refinement segment. More specifically, in instances where video encoder 20 sets the value of the num_refinement_steps_minus1 syntax element to a non-zero value, the number of encoded pictures included in the progressive refinement segment may be equal to the value of the num_refinement_steps_minus1 syntax element, plus 1.

In turn, video decoder 30 may use the value of the num_refinement_steps_minus1 syntax element to determine a number of iterative applications of the progressive refinement operation are necessary to decode the entire progressive refinement segment. More specifically, video decoder 30 may apply the progressive refinement operation indicated by the value of the progressive_refinement_id syntax element to the base picture, to decode the first encoded picture of the progressive refinement segment. Additionally, video decoder 30 may iteratively apply the same progressive refinement operation to a series of encoded pictures that immediately follow the base picture in decoding order.

More specifically, video decoder 30 may iteratively apply the identified progressive refinement operation to a number of consecutive encoded pictures that equals the value of the num_refinement_steps_minus1 syntax element. Because the num_refinement_steps_minus1 syntax element denotes a value that is one less than the total number of encoded pictures included in the progressive refinement segment, video decoder 30 may iteratively apply the progressive refinement operation to each encoded picture, except for the last encoded picture, of the progressive refinement segment. In other words, video decoder 30 may apply the values indicated by the progressive_refinement_id and num_refinement_steps_minus1 syntax elements to apply the same progressive refinement operation to the encoded base picture, and a series of encoded pictures beginning at the first entry of the progressive refinement segment, and ending at the penultimate entry of the progressive refinement segment.

Additionally, video encoder 20 may encode and signal a "progressive refinement segment end" SEI message, to specify or otherwise indicate the end of the progressive refinement segment. In some examples, video encoder 20 may signal the progressive refinement segment end SEI message in conjunction with, or after, the last encoded picture of the progressive refinement segment. Syntax and semantics for the progressive refinement segment end SEI message, as supported in HEVC WD9, are illustrated in syntax table 2 below.

SYNTAX TABLE 2

| progressive_refinement_segment_end( payloadSize ) { | Descriptor |
|---|---|
|     progressive_refinement_id | ue(v) |
| } | |

As shown in syntax table 2 above, video encoder 20 may generate the progressive refinement segment end SEI message to include a progressive_refinement_id syntax element. More specifically, video encoder 20 may set the value of the progressive_refinement_id syntax element to the same value as that of the progressive_refinement_id syntax element specified in the corresponding progressive refinement segment start SEI message for a current progressive refinement segment. As described, video encoder 20 may set the value of the progressive_refinement_id syntax element within a numerical range starting at 0 and ending at (2^32−2), both values inclusive.

In turn, video decoder 30 may decode the encoded progressive refinement segment end SEI message received in the encoded video bitstream, to determine the ending bound of the progressive refinement segment. In particular, video decoder 30 may determine, based on detecting the progressive refinement segment end SEI message, to stop applying the progressive refinement operation to decode subsequent encoded pictures signaled in the encoded video bitstream. As one example, video decoder 30 may determine that the first encoded picture following the progressive refinement segment is predicted using motion information from a preceding encoded picture signaled in the encoded video bitstream.

Additionally, in accordance with HEVC WD9, one or both of video encoder 20 and video decoder 30 may support temporal scalability of encoded video bitstreams. For instance, video encoder 20 and video decoder 30 may support varying picture rates (or "frame rates") provided by different encoded video bitstreams. For instance, to support a lower temporal picture rate than a full encoded video bitstream, video encoder 20 may signal a subset of the full encoded video bitstream. In a specific example, video encoder 20 may signal a subset of the encoded pictures included in the full encoded video bitstream. In other words, the signaled subset of encoded pictures may include at least one less encoded picture, in comparison to the full encoded video bitstream. A subset of encoded pictures signaled by video encoder 20 to support a lower picture rate is referred to herein as a "temporal subset," or a "sub-bitstream."

Video encoder 20 may signal different temporal subsets, in accordance with different picture rates provided via temporal scalability of encoded video bitstreams. In one example, video encoder 20 may support a low picture rate, by signaling a first temporal subset of the full encoded video bitstream. According to this example, video encoder 20 may support an intermediate picture rate, by signaling a second temporal subset, which includes at least one more encoded picture than the first temporal subset, but at least one less encoded picture than the full encoded video bitstream. In this example, video encoder 20 may signal a highest possible picture rate by signaling the entirety (e.g., the full set of encoded pictures) of the full encoded video bitstream.

However, in instances where video encoder 20 signals a progressive refinement segment as part of a temporal subset in accordance with HEVC WD9, video encoder 20 may not be configured to dynamically update the value of the num_refinement_steps_minus1 included in the progressive refinement segment start SEI message. As a result, video encoder 20 may potentially signal an inaccurate count of encoded pictures included in the temporally scaled progressive refinement segment. More specifically, in generating a temporal subset or sub-bitstream from the full encoded video bitstream, video encoder 20 may remove one or more encoded pictures from the full bitstream, such that the number of pictures corresponding to a progressive refinement segment in the temporal subset is less than that provided for the full set of pictures.

In some scenarios, video encoder 20 may remove one or more encoded pictures that are included in the progressive refinement segment. In a scenario where video encoder 20 removes one or more encoded pictures from the progressive refinement segment to temporally scale the full bitstream, the num_refinement_steps_minus1 syntax element may represent an incorrect value. More specifically, the value num_refinement_steps_minus1 syntax element may indicate the number of encoded pictures in the original progressive refinement segment, as represented in the full bitstream, decremented by one. However, in this scenario, the temporally scaled progressive refinement segment may include a fewer number of encoded pictures than the original progressive refinement segment of the full bitstream. Consequently, video encoder may generate and signal the num_refinement_steps_minus1 syntax element with an incorrect value, with respect to the temporally scaled progressive refinement segment.

In turn, video decoder 30 may decode the encoded progressive refinement start SEI message, and thereby obtain an incorrect value indicated by the num_refinement_steps_minus1 syntax element, with respect to the temporally scaled progressive refinement segment. As a result, video decoder 30 may apply the progressive refinement operation identified by the progressive_refinement_id to a number of consecutive encoded pictures that exceeds the number of encoded pictures in the temporally scaled progressive refinement segment. In some such examples, video decoder 30 may decode an encoded picture using only the progressive refinement operation, where in fact, the encoded picture does not represent a quality refinement of the base picture, or represents a quality refinement in addition to other modifications, such as motion-based prediction.

To mitigate or eliminate the potential inaccuracies described above with respect to temporally scaled progressive refinement segments, video encoder 20 and/or video decoder 30 may implement one or more techniques of this disclosure. In some implementations of the techniques described herein, video encoder 20 and video decoder 30 may use a picture order count (POC) value of the last entry of the progressive refinement segment to identify the bounds of the progressive refinement segment in an encoded video bitstream, regardless of whether the encoded video bitstream is a temporal subset or a full bitstream. As the POC value of an encoded picture may be a static value, video decoder 30 may not be required to derive the POC value of the ending bound of the progressive refinement segment based on a number of encoded pictures that are signaled.

Instead, in accordance with some implementations of the techniques described herein, video decoder 30 may detect the ending bound of a progressive refinement sequence, based on the POC value of the last encoded picture of the segment, at the time of decoding the last encoded picture of the segment. In various examples, information encoded by video encoder 20 may enable video decoder 30 to detect the last encoded picture of the segment, by generating and signaling information indicating the POC value of the last picture of the segment in an encoded video bitstream.

In various examples, video encoder 20 may implement one or more techniques of this disclosure to modify a progressive refinement segment start SEI message to include information indicating the POC value of the last encoded picture of the progressive refinement segment. In some examples, video encoder 20 may be configured to include, in the progressive refinement segment start SEI message, one or more syntax elements that indicate, directly or indirectly, the POC value of the last encoded picture in the progressive refinement segment.

In accordance with one such implementation, video encoder 20 may generate a syntax that indicates a "delta POC" value to indicate a difference between the POC value of the base picture and the POC value of the last picture of the progressive refinement segment. In accordance with another such implementation, video encoder 20 may generate a syntax element that indicates a "delta LSB" value that indicates a difference between the respective least significant bits (LSBs) of the base picture and the last picture of the progressive refinement segment.

Syntax and semantics for one example of a progressive refinement segment start SEI message, in which video encoder 20 may include a delta POC syntax element, in accordance with one or more aspects of this disclosure, are described in syntax table 3 below.

SYNTAX TABLE 3

| progressive_refinement_segment_start( payloadSize ) { | Descriptor |
|---|---|
|     progressive_refinement_id | ue(v) |
|     pic_order_cnt_delta | ue(v) |
| } | |

In the example of syntax table 3, the delta POC syntax element is denoted by "pic_order_cnt_delta." In implementations in which video encoder 20 signals the delta POC syntax element, video decoder 30 may use the value of the signaled delta POC syntax element to determine the last encoded picture of the progressive refinement segment. More specifically, video decoder 30 may detect the beginning of the progressive refinement segment, based on detecting the progressive refinement segment start SEI message. Additionally, video decoder 30 may apply the value of the delta POC syntax element to the POC value of the base picture, to obtain the POC value of the last picture of the progressive refinement segment. In turn, video decoder 30 may iteratively apply the progressive refinement operation indicated by the value of the progressive_refinement_id syntax element to each of a series of encoded pictures that follow the base picture, until video decoder 30 detects the last picture of the segment. In particular, video decoder 30 may detect the last picture of the progressive refinement segment based on the POC value of the last picture, as derived based on the value of the delta POC syntax element.

Similarly, in implementations where video encoder 20 signals the delta LSB syntax element, video decoder 30 may apply the value of the delta LSB syntax element to the LSB of the POC value of the base picture. By applying the value of the delta LSB syntax element to the LSB of the POC value of the base picture, video decoder 30 may obtain the LSB of the POC value of the last encoded picture in the progressive refinement segment. In turn, using the obtained LSB of the POC value of the last encoded picture in the progressive refinement segment, video decoder 30 may detect the ending bound of the progressive refinement segment.

More specifically, video decoder 30 may decode the series of encoded pictures that make up the progressive refinement segment by iteratively applying the identified progressive refinement operation, until video decoder 30 detects the last encoded picture of the segment. Upon detecting the last encoded picture of the progressive refinement segment using the LSB of the POC value, video decoder 30 may cease decoding according to the parameters specified in the progressive refinement segment start SEI message (namely, the operation identified by the value of the progressive_refinement_id syntax element).

By implementing one or more of the techniques described above, one or both of video encoder 20 and video decoder 30 may implement video coding using progressive refinement, while supporting temporal scalability of encoded video bitstreams. According to various examples, video encoder 20 and/or video decoder 30 may use static information, such as POC values, to determine the bounds of a progressive refinement segment, regardless of whether the progressive refinement segment is temporally scaled to include fewer pictures than as originally determined.

In this manner, one or both of source device 12 and destination device 14 may be an example of a device for coding video data, comprising a video coder, namely, video encoder 20 and video decoder 30, respectively. Additionally, in accordance with the techniques described above, one or both of video encoder 20 and video decoder 30 may be examples of a video coder configured to determine information indicating a picture order count (POC) value of a last picture of a plurality of pictures in a progressive refinement segment in an encoded bitstream, and code at least some of the pictures in the progressive refinement segment according to a progressive refinement operation.

Additionally, in some examples, the determined information includes a delta POC value that indicates a difference between a POC value of a picture that immediately precedes the progressive refinement segment and the POC value of the last picture of the progressive refinement segment. In some examples, the determined information includes a delta of least significant bits (LSBs) that indicates a difference between LSBs of a POC value of a picture that immediately precedes the progressive refinement segment and LSBs of a POC value of the last picture of the progressive refinement segment. In some examples, the determined information includes a POC value of the last picture of the progressive refinement segment.

According to some implementations of the techniques described herein, to determine the information, video encoder 20 and/or video decoder 30 may be configured to determine the information based at least in part on a supplemental enhancement information (SEI) message included in the encoded bitstream. In one such example, the SEI message comprises a progressive refinement segment start SEI message that indicates a starting bound of the progressive refinement segment.

In some examples in accordance with the techniques described herein, video encoder 20 and/or video decoder 30 may be further configured to determine that an encoded picture immediately precedes the progressive refinement segment in an encoded video bitstream. In one such example, each of the plurality of pictures in the progressive refinement sequence defines a quality refinement in comparison to the encoded picture that immediately precedes the progressive refinement sequence.

According to some implementations of the techniques of this disclosure, to code at least some of the pictures in the progressive refinement segment according to the progressive refinement operation, video encoder 20 and/or video decoder 30 may be configured to apply the progressive refinement operation to each picture in the progressive refinement segment, except for the last picture in the progressive refinement segment. In some implementations, video encoder 20 and/or video decoder 30 may include at least one of an integrated circuit, a microprocessor, and a communication device that comprises the respective one or both of video encoder 20 and video decoder 30. In some examples, video encoder 20 may be configured to decode encoded video data.

Figure 2:
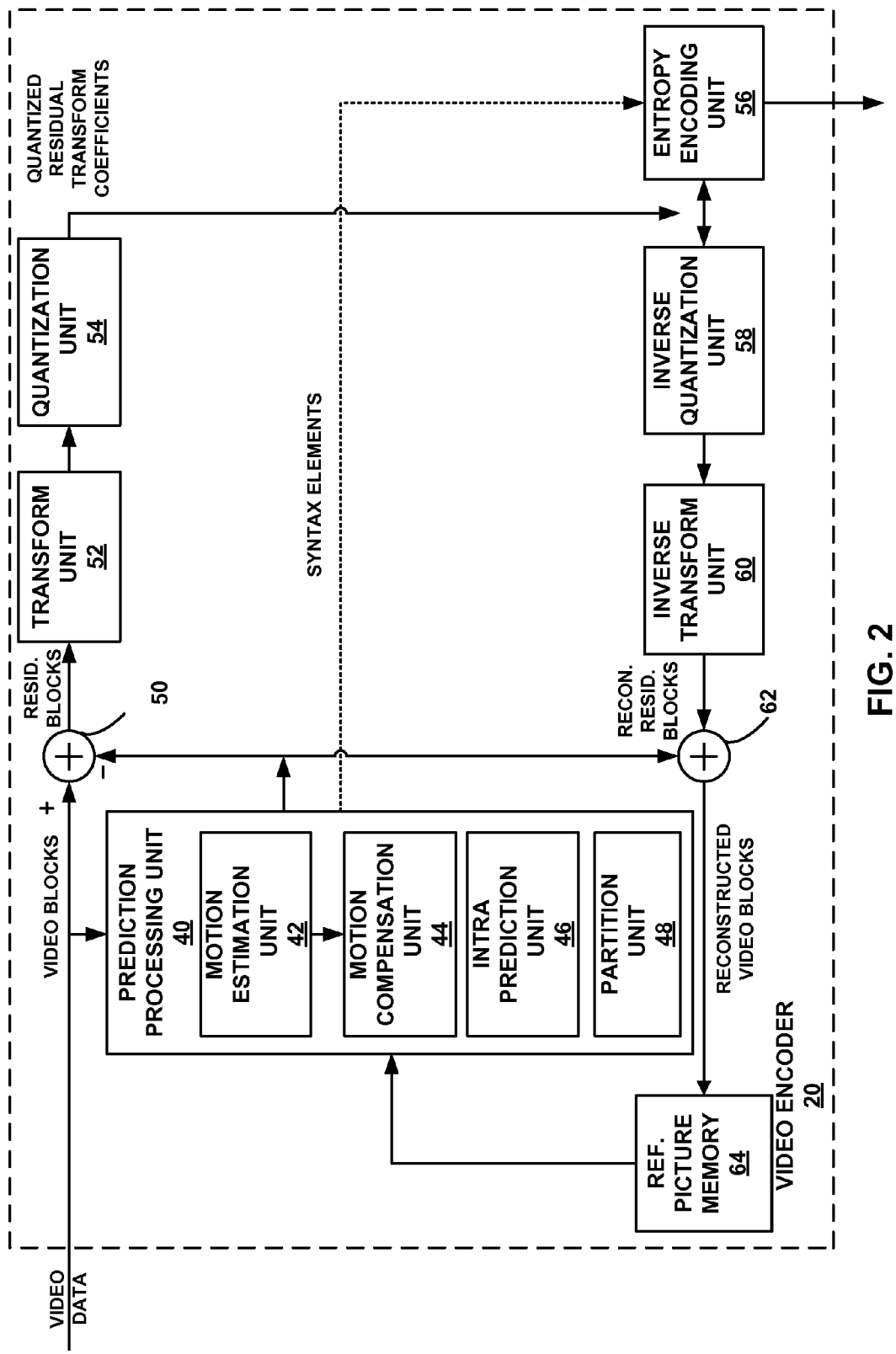
FIG. 2 is a block diagram illustrating an example video encoder that may implement one or more techniques described in this disclosure.

FIG. 2 is a block diagram illustrating an example of video encoder 20 that may implement techniques for encoding video data, in accordance with one or more aspects of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes prediction processing unit 40, reference frame memory 64, summer 50, transform processing unit 52, quantization unit 54, and entropy encoding unit 56. Prediction processing unit 40, in turn, includes motion compensation unit 44, motion estimation unit 42, and intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 62 (as an in-loop filter).

During the encoding process, video encoder 20 receives a video frame or slice to be coded. The frame or slice may be divided into multiple video blocks by prediction processing unit 40. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Prediction processing unit 40 may further produce a quadtree data structure indicative of partitioning of an LCU into sub-CUs. Leaf-node CUs of the quadtree may include one or more PUs and one or more TUs.

Prediction processing unit 40 may select one of the coding modes, intra or inter, e.g., based on error results, and provides the resulting intra- or inter-coded block to summer 50 to generate residual block data and to summer 62 to reconstruct the encoded block for use as a reference frame. Prediction processing unit 40 also provides syntax elements, such as motion vectors, intra-mode indicators, partition information, and other such syntax information, to entropy encoding unit 56. Prediction processing unit 40 may select one or more inter-modes using rate-distortion analysis.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma coding blocks, and motion compensation unit 44 uses motion vectors calculated based on the luma coding blocks for both chroma coding blocks and luma coding blocks. Prediction processing unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or prediction processing unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Various components of video encoder 20 may be configured to implement one or more of techniques of this disclosure to encode video data using progressive refinement, while supporting temporal scalability of video bitstreams. For instance, video encoder 20 may implement one or more of the techniques to generate and signal a supplemental enhancement information (SEI) message, such that the SEI message enables a receiving device (e.g., a video decoder or components thereof) to determine the starting and ending bounds of a progressive refinement segment, regardless of whether the segment is temporally scaled to include fewer encoded pictures. In one example, prediction processing unit 40 may be configured to generate a progressive refinement segment start SEI message, in accordance with one or more aspects of this disclosure.

Video encoder 20 may be configured, in accordance with HEVC WD 9, AVC, or other video coding standard, to include metadata in an encoded video bitstream. In various examples, video encoder 20 may include metadata that are not required by a decoder in order to decode the signaled encoded video bitstream. As some examples, video encoder 20 may signal metadata that enables a video decoder to determine picture output timing, determine display information associated with one or more pictures, detect loss information, and to conceal and/or remediate detected losses.

Additionally, video encoder 20 may generate any number of SEI network abstraction layer (NAL) units in a particular access unit (AU) signaled in the encoded video bitstream. In turn, video encoder 20 may include any number of SEI messages in a particular SEI NAL unit. Table 1 above lists various SEI messages that video encoder 20 may generate, and corresponding uses/purposes of the listed SEI messages, in accordance with HEVC WD9.

Video encoder 20 may be configured or otherwise operable to generate and signal progressive refinement segments in an encoded video bitstream. As described with respect to FIG. 1, a progressive refinement segment, in accordance with HEVC WD9, may include a sequence of encoded pictures in decoding order. In some examples, the sequence of encoded pictures in the progressive refinement segment may also be arranged according to output order. In particular, each encoded picture of the progressive refinement segment may represent an incremental and cumulative quality refinement in comparison to an encoded picture that immediately precedes the progressive refinement segment in decoding order.

Video encoder 20 may signal a progressive refinement segment start SEI message to indicate the starting bound of the progressive refinement segment. As illustrated in syntax table 1 above, video encoder 20 may, in accordance with HEVC WD9, include progressive_refinement_id and num_refinement_steps_minus1 syntax elements in the progressive refinement segment start SEI message. In accordance with HEVC WD9, video encoder 20 may determine that the progressive refinement segment continues (e.g., that each subsequent encoded picture in the encoded bitstream is solely a quality refinement over the preceding encoded picture), until one or more conditions are met. For instance, video encoder 20 may determine that the progressive refinement segment continues until one of the following conditions is met:

Video encoder 20 determines a beginning of a new coded video sequence.

Video encoder 20 determines an end of the encoded video bitstream.

Video encoder 20 determines that the value of the num_refinement_steps_minus1 syntax element is greater than zero, and that the least significant bit of the of the POC value (denoted by "pic_order_cnt_lsb") of the next slice in decoding order is equal to the output of the following formula: (currPicOrderCntLsb+num_refinement_steps_minus1+1) % MaxPicOrderCntLsb, where currPicOrderCntLsb is the value of pic_order_cnt_lsb of the picture in the access unit containing the SEI message. The "%" operator denotes a modulo operation, which yields the value of the remainder of an integer division operation.

Video encoder 20 determines that the value of the num_refinement_steps_minus1 is equal to zero, and that a progressive refinement segment end SEI message with the same progressive_refinement_id value as the one in the current progressive refinement segment start SEI message is encoded.

Additionally, video encoder 20 may indicate to a decoder that an SEI NAL unit precedes, in decoding order, the first video coding layer (VCL) NAL unit in a current AU, by generating the SEI NAL unit to include a progressive refinement segment start SEI message, and a "nuh_reserved_zero_6bits" syntax element with a value equal to zero. Video encoder 20 may set the value of the progressive_refinement_id syntax element within a numerical range starting at 0 and ending at (2^32−2), both values inclusive. For example, video encoder 20 may set the progressive_refinement_id syntax element to values in the ranges of 0 to 255, both values inclusive, and 512 to (2^31−1), both values inclusive, to identify a specific progressive refinement operation associated with the progressive refinement segment. In other words, any value assigned to the progressive_refinement_id syntax element in the ranges described above may be associated with a particular progressive refinement operation supported in HEVC WD9.

On the other hand, values of the progressive_refinement_id syntax element that fall within the ranges of 256 to 511, both values inclusive, and 2^31 to (2^32−2), both values inclusive, are reserved for future use by ITU-T and/or ISO/IEC. More specifically, if video encoder 20 sets the progressive_refinement_id syntax element to a value in one of the reserved ranges described above, a device that receives the bitstream, such as a video decoder, may disregard the progressive refinement id syntax element. In particular, to disregard this syntax element, a video decoder may remove the progressive_refinement_id syntax element from the received encoded video bitstream, and discard the progressive_refinement_id syntax element.

As described, video encoder 20 and/or components thereof may be configured to support temporal scalability of encoded video bitstreams, such as in accordance with HEVC WD9. For instance, video encoder 20 may generate a full encoded video bitstream, from which a receiving device, such as a decoding device or intermediate device, may extract a sub-bitstream. For example, an intermediate device, such as a streaming server or a media-aware network element ("MANE") may extract a temporal subset of encoded pictures from the full set of encoded pictures included in the full encoded video bitstream. In some examples, the temporal subset may represent a true subset of the full set of encoded pictures included in the full encoded video bitstream. According to these examples, the full encoded video bitstream may include every encoded picture of the temporal subset, and at least one additional encoded picture that is not included in the temporal subset.

To support various picture rates in accordance with temporal scalability, an intermediate device may be configured to extract temporal subsets of different picture counts from the full set of encoded pictures included in the full encoded video bitstream. Each different temporal subset extracted by the intermediate device (e.g., to support varying picture rates) may represent an independently decodable temporal subset or sub-bitstream. In other words, a video decoder that receives a temporally scaled sub-bitstream extracted from the full encoded video bitstream may decode the temporal subset of encoded pictures without any additional data, such as information included in the full encoded video bitstream but excluded from the sub-bitstream.

A full encoded video bitstream generated by video encoder 20, in accordance with HEVC WD9, may include several temporal sub-layers. Additionally, each NAL unit generated by video encoder 20 may belong to a specific sub-layer as indicated by a corresponding "TemporalId" value. For example, video encoder 20 may set the value of the TemporalId of a NAL unit equal to the value of the corresponding "temporal_id_plus1" syntax element, minus one. Additionally, video encoder 20 may determine that all VCL NAL units of a single picture belong to a single sub-layer (i.e., the same sub-layer). In other words, video encoder 20 may encode a picture, such that the encoded picture itself belongs to the particular sub-layer corresponding to the NAL units associated with the encoded picture.

For example, in accordance with HEVC WD9, video encoder 20 may generate an encoded video bitstream such that a decoding process of a lower sub-layer of the bitstream is not dependent on data in a higher sub-layer of the bitstream. Additionally, the intermediate device may generate a sub-bitstream from a full bitstream, which conforms to HEVC WD9, by removing, from the full bitstream, all NAL units associated with a TemporalId value that is higher than a specific value. In turn, the sub-bitstream generated in this manner, may itself represent a bitstream conforming to HEVC WD9. Video encoder 20 and/or one or more components thereof may ensure that all conditions for bitstream conformance (e.g., buffer restrictions) with respect to HEVC WD9, are fulfilled for full encoded video bitstream, and for any given sub-layer thereof.

As described, in temporally scaling a full encoded video bitstream, the intermediate device may extract a temporal subset of encoded pictures from the full encoded video bitstream. For instance, the temporal subset may be a true subset of the encoded pictures signaled in the full encoded video bitstream, and therefore, the intermediate device may remove one or more encoded pictures from the full encoded bitstream to generate the sub-bitstream. In examples, the intermediate device may remove one or more encoded pictures that are included in a progressive refinement segment. However, in these examples, the intermediate device may not be configured to update the data signaled in the progressive refinement segment start SEI message, to reflect the change (i.e., reduction) in the number of encoded pictures included in the temporally scaled progressive refinement segment. In other words, the intermediate device may potentially signal an incorrect value of the num_refinement_steps_minus1 syntax element to a receiving device, such as a video decoder. In turn, by communicating an incorrect value of the num_refinement_steps_minus1 syntax element, the intermediate device may cause the video decoder to apply the progressive refinement operation to decode pictures after the end of the temporally scaled progressive refinement segment.

To mitigate or eliminate erroneous decoding of pictures that are positioned after the end of the progressive refinement segment in the encoded video bitstream, video encoder 20 may implement one or more techniques of this disclosure. According to some implementations of the techniques, video encoder 20 may generate the progressive refinement segment start SEI message to include information that enables a video decoder to determine the picture order count (POC) value of the last picture of the progressive refinement segment. The POC value may represent a static value that is associated with a particular encoded picture signaled in the encoded video bitstream, and thus, may identify the particular encoded picture, regardless of temporal scaling.

For instance, by deriving the POC value of the last encoded picture of the progressive refinement segment, a video decoder receiving the encoded video bitstream may accurately identify the last encoded picture. More specifically, the video decoder may identify the last encoded picture of the progressive refinement segment, regardless of whether the intermediate device has temporally scaled the progressive refinement segment. In examples where e the intermediate device temporally scales the progressive refinement segment, the video decoder may accurately identify the last picture of the progressive refinement segment, regardless of the extent to which the intermediate device temporally scales the progressive refinement segment. In other words, the video decoder may identify the last encoded picture (i.e., the ending bound) of the progressive refinement segment, regardless of the picture rate that the intermediate device generates, using temporal scalability.

According to various implementations of the techniques described herein, video encoder 20 may generate a progressive refinement segment start SEI message to include information that a decoder may use to determine the POC value associated with the last encoded picture of the progressive refinement segment. In one implementation, video encoder 20 may generate the progressive refinement segment start SEI message to include data indicating a "delta POC" value. More specifically, video encoder 20 may generate the delta POC value, such that the delta POC value indicates a difference between the POC value of the base picture and the POC value of the last encoded picture of the progressive refinement segment.

A video decoder that receives an encoded video bitstream generated by video encoder 20 may use the progressive refinement segment start SEI message to detect the starting bound (e.g., the first encoded picture) of a corresponding progressive refinement segment. Additionally, the video decoder may determine the ending bound (e.g., the last encoded picture) of the progressive refinement segment by applying the delta POC value to the POC value of the base picture (e.g., the encoded picture that immediately precedes the starting bound, in decoding order). For example, by applying the delta POC value to the POC value of the base picture, the video decoder may derive the POC value of the ending bound of the progressive refinement segment.

As described, the POC value of a particular encoded picture may be a static value associated with the encoded picture, and may indicate the position of the encoded picture in decoding order. By providing a decoder with data from which to derive the POC value of the ending bound of the progressive refinement segment, video encoder 20 may enable the decoder to determine the ending bound of the progressive refinement segment, irrespective of whether, and by what magnitude, an intermediate device temporally scales the progressive refinement segment. Video encoder 20 may signal the delta POC value in the form of a "pic_order_cnt_delta" syntax element, as illustrated in syntax table 3 above. In various examples, video encoder 20 may signal the pic_order_cnt_delta syntax element in the progressive refinement segment start SEI message, or in one or more slice headers associated with respective slices of the base picture. In this manner, video encoder 20 may implement one or more techniques of this disclosure to enable a decoder to decode a progressive refinement sequence using a corresponding progressive refinement operation, while supporting temporal scalability of encoded video bitstreams.

According to some implementations in which video encoder 20 generates the progressive refinement segment start SEI message to include data associated with the POC value of the ending bound of the progressive refinement segment, video encoder 20 may include a delta of least significant bits (LSBs) in the progressive refinement segment start SEI message. In these implementations, video encoder 20 may generate the delta of LSBs to indicate a difference between the LSB value of the POC value of the base picture, and LSB value of the POC value of the last encoded picture of the progressive refinement segment.

In turn, video encoder 20 may enable a decoder that receives the encoded video bitstream to derive the POC value of the ending bound of the progressive refinement segment by applying the delta of LSBs to the LSB of the POC value of the base picture. For instance, video encoder 20 may generate the progressive refinement segment start SEI message to include a syntax element indicating the delta of LSBs, instead of the "num_refinement_steps_minus1" syntax element. According to some implementations, video encoder 20 may signal the syntax element as part of one or more slice headers associated with respective slices of the base picture.

By including the syntax element to indicate the delta of LSBs, entropy encoding unit 56 may enable the decoder to determine the ending bound of the progressive refinement segment, irrespective of whether, and by what magnitude, the intermediate device temporally scales the progressive refinement segment. For instance, by signaling the delta of LSBs, video encoder 20 may enable a decoder to derive the POC value of the ending bound of the progressive refinement segment, and thereby identify the ending bound using a static value associated with the ending bound. In this manner, video encoder 20 may implement one or more techniques of this disclosure to enable a decoder to decode a progressive refinement sequence using a corresponding progressive refinement operation, while supporting temporal scalability of encoded video bitstreams.

According to other implementations of the techniques described herein, video encoder 20 may generate the progressive refinement segment start SEI message to include data indicating the number of consecutive encoded pictures that 1) are associated with a TemporalId value that is less than or equal to the TemporalId value of the base picture, and 2) represent progressive quality refinements of the base picture.

In some examples, a decreasing TemporalId value may indicate an advancement in the encoded video bitstream, according to decoding order. For instance, the first encoded picture of the progressive refinement segment may have a TemporalId value that is less than the TemporalId value of the base picture. In turn, the second encoded picture of the progressive refinement segment may have a TemporalId value that is less than the TemporalId of the first encoded picture of the progressive refinement segment, and so on.

The base picture may be the encoded picture included in the current access unit, and the base picture may immediately precede the first encoded picture of the progressive refinement segment in decoding order. In some examples, the base picture may also immediately precede the first encoded picture of the progressive refinement segment in output order. In some such examples, the progressive refinement segment may include a sequence of encoded pictures that are consecutive in both decoding order and in output order.

According to these implementations of the techniques described herein, video encoder 20 may generate the progressive refinement segment start SEI message to include data indicating the number of consecutive encoded pictures that have a TemporalId value less than the TemporalId value of the base picture, as well as represent progressive quality refinements of the base picture. For instance, the information may indicate the number of encoded pictures in the sequence that makes up the progressive refinement segment. In these implementations, an intermediate device may determine the number of consecutive encoded pictures that satisfy the conditions listed above. For example, the intermediate device may determine a number of consecutive encoded pictures satisfying the conditions, with respect to each temporal subset of encoded pictures extracted from the full encoded video bitstream.

By determining the number of consecutive encoded pictures that satisfy the above conditions, the intermediate device may more accurately determine the number of encoded pictures available from the progressive refinement segment, even in scenarios where the intermediate device temporally scales the progressive refinement segment. In turn, the intermediate device may communicate the determined number of consecutive encoded pictures that have a TemporalId value less than the TemporalId value of the base picture, as well as represent progressive quality refinements of the base picture. In various examples, video encoder 20 may generate the progressive refinement segment start SEI message to include a syntax element that indicates the determined number of consecutive encoded pictures that have a TemporalId value less than the TemporalId value of the base picture, as well as represent progressive quality refinements of the base picture. For instance, video encoder 20 may generate the progressive refinement segment start SEI message to include the syntax element indicating the determined number, instead of the num_refinement_steps_minus1 syntax element illustrated in Syntax Table 1 above. In some examples, video encoder 20 may signal the syntax element indicating the determined number as part of one or more slice headers associated with respective slices of the base picture.

Video encoder 20 may, by signaling the number of consecutive encoded pictures that have a TemporalId value less than the TemporalId value of the base picture and represent progressive quality refinements of the base picture, provide a video decoder with an accurate length of the progressive refinement segment. As one example, by signaling the information described above as part of a progressive refinement segment start SEI message, video encoder 20 may provide a receiving decoder with the length of the progressive refinement segment, regardless of whether an intermediate device temporally scales the progressive refinement segment. In turn, the decoder that receives the progressive refinement segment start SEI message may utilize the syntax element included in the progressive refinement segment start SEI message to determine the length of the progressive refinement segment, regardless of whether, or by what magnitude, the decoder temporally scales the progressive refinement segment. In this manner, video encoder 20 may implement one or more techniques of this disclosure to signal a number of consecutive encoded pictures that 1) have a TemporalId value less than the TemporalId of base picture, and 2) represent progressive quality refinements of the base picture, thereby enabling a video decoding device to decode a progressive refinement segment, while supporting temporally scalable video bitstreams.

As described with respect to FIG. 2, video encoder 20 and/or components thereof may perform a method of encoding video data, the method including encoding at least some pictures of a plurality of pictures in a progressive refinement segment according to a progressive refinement operation, and generating information indicating a picture order count (POC) value of a last picture of the progressive refinement segment in an encoded bitstream. In some example implementations of the method described above with respect to video encoder 20, the generated information includes a delta POC value that indicates a difference between a POC value of a picture that immediately precedes the progressive refinement segment and the POC value of the last picture of the progressive refinement segment. According to some example implementations of the method described above with respect to video encoder 20, the generated information includes a delta of least significant bits (LSBs) that indicates a difference between LSBs of a POC value of a picture that immediately precedes the progressive refinement segment and LSBs of a POC value of the last picture of the progressive refinement segment. In one example of the method described above with respect to video encoder 20, the generated information includes a POC value of the last picture of the progressive refinement segment.

According to some implementations of the method described above with respect to video encoder 20, generating the information comprises including the information in a supplemental enhancement information (SEI) message to be signaled in the encoded video bitstream. In one such implementation, the SEI message comprises a progressive refinement segment start SEI message that indicates a starting bound of the progressive refinement segment. According to some implementations of the method described above with respect to video encoder 20, the method may further include determining that an encoded picture immediately precedes the progressive refinement segment in an encoded video bitstream. In one such implementation, each picture in the progressive refinement sequence defines a quality refinement in comparison to the encoded picture that immediately precedes the progressive refinement sequence.

In some examples of the method described above with respect to video encoder 20, the method may further comprise detecting the last picture of the plurality of pictures in the progressive refinement segment, and ceasing encoding according to the progressive refinement operation. According to some implementations of the method described above with respect to video encoder 20, encoding at least some of the pictures in the progressive refinement segment according to the progressive refinement operation comprises applying the progressive refinement operation to each picture in the progressive refinement segment, except for the last picture in the progressive refinement segment.

In some examples, video encoder 20 may be included in a device for coding video data, such as a desktop computer, notebook (i.e., laptop) computer, tablet computer, set-top box, telephone handset such as a so-called "smart" phone, so-called "smart" pad, television, camera, display device, digital media player, video gaming console, video streaming device, or the like. In these or other examples, such a device for coding video data may include one or more of an integrated circuit, a microprocessor, and a communication device that includes video encoder 20. In some examples, video encoder 20 may also be configured to decode encoded video data, such as through entropy decoding the encoded video data.

Figure 3:
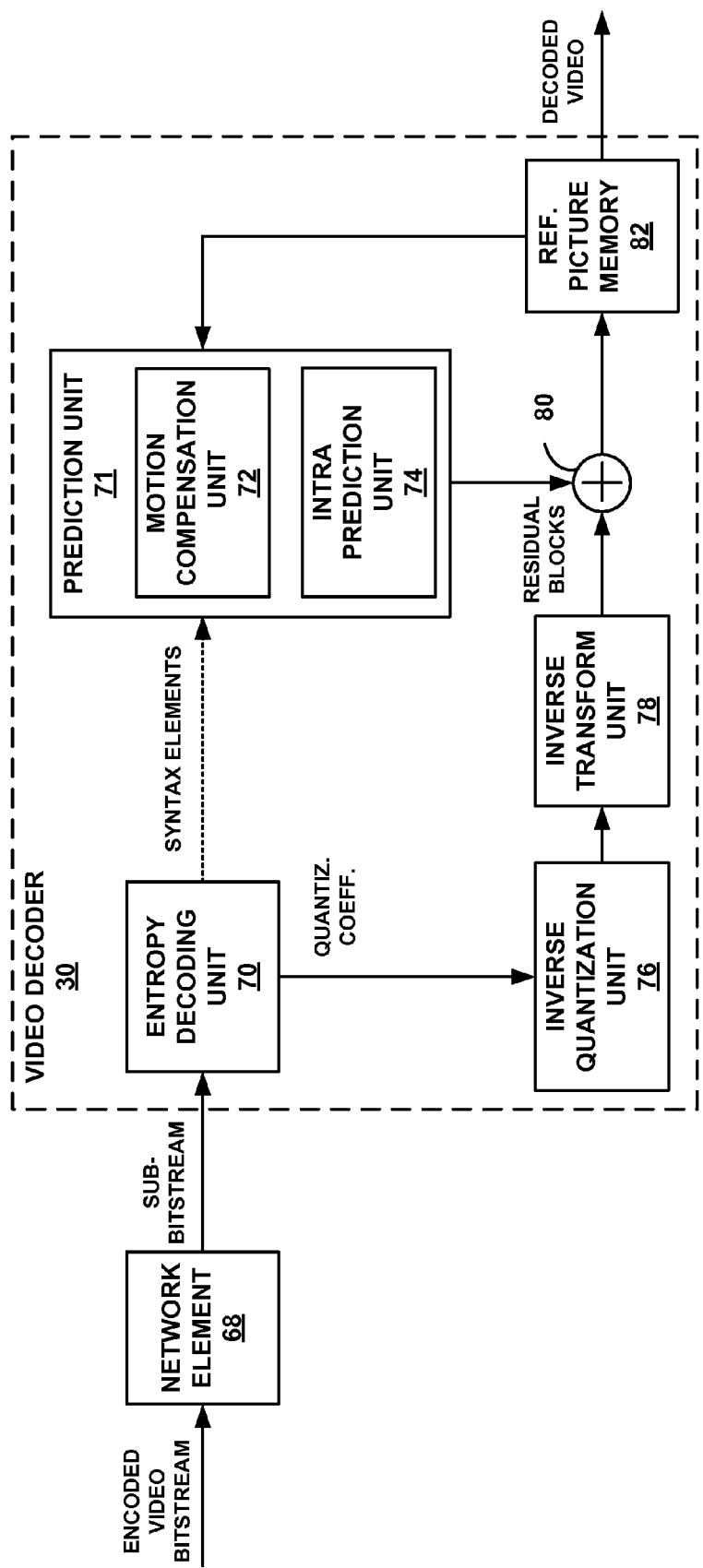
FIG. 3 is a block diagram illustrating an example video decoder that may implement one or more techniques described in this disclosure.

FIG. 3 is a block diagram illustrating an example of video decoder 30 that may implement techniques for decoding video data, in accordance with one or more aspects of this disclosure. In the example of FIG. 3, video decoder 30 includes an entropy decoding unit 70, motion compensation unit 72, intra prediction unit 74, inverse quantization unit 76, inverse transform unit 78, summer 80, and reference picture memory 82. In the example of FIG. 3, video decoder 30 includes prediction unit 71, which, in turn, includes motion compensation unit 72 and intra prediction unit 74. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra prediction unit 74 may generate prediction data based on intra-prediction mode indicators received from entropy decoding unit 70.

In the implementation illustrated in FIG. 3, video decoder 30 is coupled to a network element 68. In various examples, network element 68 may include, be, or be part of a variety of devices, such as a media-aware network element (or "MANE"), a streaming server, or a network headend device. For instance, network element 68 may be configured to receive an encoded video bitstream signaled by video encoder 20, and temporally scale the encoded video bitstream. In this example, network element 68 may relay the temporally scaled bitstream to video decoder 30.

As one example, network element 68 may extract a temporal subset of encoded pictures from the full set of encoded pictures included in the received encoded video bitstream. The encoded video bitstream received by network element 68 may be referred to herein as a "full encoded video bitstream." Additionally, the temporal subset extracted by network element 68 may represent a true subset of the full set of encoded pictures included in the full encoded video bitstream. In other words, the full encoded video bitstream received by network element 68 may include every encoded picture of the temporal subset, and at least one additional encoded picture that is not included in the temporal subset.

To support various picture rates in accordance with temporal scalability, network element 68 may be configured to extract temporal subsets of different picture counts from the full set of encoded pictures included in the full encoded video bitstream. Each different temporal subset extracted by network element 68 (e.g., to support varying picture rates) may represent an independently decodable temporal subset or sub-bitstream. In other words, a device, such as video decoder 30 that receives a temporally scaled sub-bitstream extracted by network element 68 may decode the temporal subset of encoded pictures without any additional data, such as information included in the full encoded video bitstream but excluded from the sub-bitstream.

Network element 68 may determine that a full encoded video bitstream signaled by video encoder 20, in accordance with HEVC WD9, includes several temporal sub-layers. Additionally, network element 68 may determine that each NAL unit signaled by video encoder 20 belongs to a specific sub-layer as indicated by a corresponding "TemporalId" value. For instance, network element 68 may determine that the value of the TemporalId of a NAL unit is equal to the value of the corresponding "temporal_id_plus1" syntax element, minus one. Additionally, in this example, network element 68 may determine that all VCL NAL units of a single picture belong to a single sub-layer (i.e., the same sub-layer). In other words, network element 68 may determine that a particular encoded picture itself belongs to the particular sub-layer corresponding to the NAL units associated with the encoded picture.

For example, in accordance with HEVC WD9, video encoder 20 may generate an encoded video bitstream such that a decoding process of a lower sub-layer of the bitstream (e.g., as extracted by network element 68) is not dependent on data in a higher sub-layer of the bitstream. Network element 68 may extract a sub-bitstream from a full bitstream, which conforms to HEVC WD9, by removing, from the full bitstream, all NAL units associated with a TemporalId value that is higher than a specific value. In turn, the sub-bitstream extracted by network element 68 in this manner, may itself represent a bitstream conforming to HEVC WD9. Video encoder 20 and/or one or more components thereof may ensure that all conditions for bitstream conformance (e.g., buffer restrictions) with respect to HEVC WD9, are fulfilled for each sub-bitstream.

As described, in temporally scaling a full encoded video bitstream, network element 68 may extract a temporal subset of encoded pictures from the full encoded video bitstream. For example, the temporal subset may be a true subset of the encoded pictures signaled in the full encoded video bitstream, and therefore, network element 68 may remove one or more encoded pictures from the full encoded bitstream to generate the sub-bitstream. In examples, network element 68 may remove one or more encoded pictures that are included in a progressive refinement segment.

However, in these examples, network element 68 may not be configured to update the data signaled in the progressive refinement segment start SEI message, to reflect the change (i.e., reduction) in the number of encoded pictures included in the temporally scaled progressive refinement segment. In other words, network element 68 may potentially relay an incorrect value of the num_refinement_steps_minus1 syntax element to video decoder 30. In turn, by relaying an incorrect value of the num_refinement_steps_minus1 syntax element, network element 68 may cause video decoder 30 to apply the progressive refinement operation to decode pictures after the end of the temporally scaled progressive refinement segment.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30, and various components thereof, may implement techniques of this disclosure to decode a progressive refinement segment, while supporting temporally scalable video bitstreams. As one example, entropy decoding unit 70 may implement one or more functionalities described below with respect to video decoder 30. As described, video decoder 30 may receive an encoded video bitstream signaled by a video encoder. In various examples, video decoder 30 may receive a full encoded video bitstream, or a sub-bitstream, which network element 68 may extract, in accordance with temporal scalability. More specifically, a temporally scaled sub-bitstream may include a subset of encoded pictures extracted from the set of encoded pictures included in the full encoded video bitstream. A picture subset extracted by network element 68 in accordance with temporal scalability may be referred to herein as a "temporal subset." In some examples, the temporal subset extracted by network element 68 may represent a true subset of the encoded pictures in the full encoded video bitstream. In other words, according to these examples, the full encoded video bitstream may include every encoded picture of the temporal subset, and at least one additional encoded picture that is not included in the temporal subset.

Additionally, in accordance with HEVC WD9, AVC, or other video coding standards, video decoder 30 may be configured or otherwise operable to decode metadata included in the received encoded video bitstream. In various examples, in accordance with HEVC WD9, video decoder 30 may decode metadata that are not required for decoding the encoded pictures signaled in the encoded bitstream. In various examples, video decoder 30 may decode metadata to determine one or more of picture output timing, and display information associated with one or more pictures. In these and other examples, video decoder 30 may decode metadata to detect loss information, and to conceal and/or remediate one or more detected losses.

In some examples, e.g., in accordance with HEVC WD9, video decoder 30 may decode one or more supplemental enhancement information (SEI) network abstraction layer (NAL) units in a particular access unit (AU) signaled in the received encoded video bitstream. Additionally, video decoder 30 may decode one or more SEI messages included in a single SEI NAL unit that is signaled in the received encoded video bitstream. Table 1 above lists examples of various SEI messages that video decoder 30 may receive and decode (e.g., using entropy decoding unit 70), and corresponding uses/purposes of the listed SEI messages, in accordance with HEVC WD9.

Additionally, video decoder 30 may be configured or otherwise operable to decode progressive refinement segments signaled in a received encoded video bitstream. As described with respect to FIG. 1, a progressive refinement segment, in accordance with HEVC WD9, may include a sequence of encoded pictures in decoding order. In some examples, the sequence of encoded pictures in the progressive refinement segment may also be arranged according to output order. In various scenarios, each encoded picture of the progressive refinement segment may represent a quality refinement over a base picture (e.g., an encoded picture that immediately precedes the starting bound, in decoding order). In one such scenario, each encoded picture of the progressive refinement segment may represent an incremental and cumulative quality refinement in comparison to an encoded picture that immediately precedes the progressive refinement segment in decoding order.

Video decoder 30 may decode a progressive refinement segment start SEI message, such as by implementing one or more functionalities provided by entropy decoding unit 70. Based on the decoded progressive refinement segment start SEI message, video decoder 30 may detect the starting bound of the progressive refinement segment. As illustrated in syntax table 1 above, video decoder 30 may, in accordance with HEVC WD9, decode progressive_refinement_id and num_refinement_steps_minus1 syntax elements in the signaled progressive refinement segment start SEI message. In accordance with HEVC WD9, video decoder 30 may determine that the progressive refinement segment continues (e.g., that each subsequent encoded picture in the encoded bitstream is solely a quality refinement over the preceding encoded picture), until one or more conditions are met. For instance, video decoder 30 may determine that the progressive refinement segment continues until one of the following conditions is met:

- Video decoder 30 detects a beginning of a new coded video sequence.
- Video decoder 30 detects an end of the encoded video bitstream.
- Video decoder 30 determines that the value of the signaled num_refinement_steps_minus1 syntax element is greater than zero, and that the least significant bit of the POC value (denoted by "pic_order_cnt_lsb") of the next slice in decoding order is equal to the result of the following formula: (currPicOrderCntLsb+num_refinement_steps_minus1+1) % MaxPicOrderCntLsb, where currPicOrderCntLsb is the value of pic_order_cnt_lsb of the picture in the access unit containing the SEI message. The "%" operator denotes a modulo operation, which yields the value of the remainder of an integer division operation.
- Video decoder 30 determines that the value of the signaled num_refinement_steps_minus1 is equal to zero, and that a signaled progressive refinement segment end SEI message with the same progressive_refinement_id value as the one in the current progressive refinement segment start SEI message is decoded.

Additionally, video decoder 30 may determine, when a signaled SEI NAL unit includes a progressive refinement segment start SEI message, and includes a "nuh_reserved_zero_6bits" syntax element with a value equal to zero, that the signaled SEI NAL unit precedes, in decoding order, the first VCL NAL unit in a current AU. In decoding the progressive refinement segment start SEI message, video decoder 30 may determine that the value of the progressive_refinement_id syntax element falls within a numerical range starting at 0 and ending at ($2^{32}-2$), both values inclusive.

For example, if video decoder 30 determines that the progressive_refinement_id syntax element has a value within the ranges of 0 to 255, both values inclusive, and 512 to ($2^{31}-1$), both values inclusive, video decoder 30 may use the detected value to identify a specific progressive refinement operation associated with the progressive refinement segment. In other words, any value assigned to the progressive_refinement_id syntax element in the ranges described above may be associated with a particular progressive refinement operation supported in HEVC WD9. In turn, if the progressive_refinement_id syntax element has a value in one of the ranges described above, video decoder 30 may decode each encoded picture of the progressive refinement segment using the particular progressive refinement operation identified by the value of the progressive_refinement_id syntax element.

On the other hand, values of the progressive_refinement_id syntax element that fall within the ranges of 256 to 511, both values inclusive, and $2^{31}$ to ($2^{32}-2$), both values inclusive, are reserved for future use by ITU-T and/or ISO/IEC. If video decoder 30 detects that the progressive_refinement_id syntax element is equal to a value in one of the reserved ranges described above, then video decoder 30 may disregard the progressive_refinement_id syntax element. In particular, to disregard this syntax element, video decoder 30 may remove the progressive_refinement_id syntax element from the received encoded video bitstream, and discard the progressive_refinement_id syntax element.

As described, video decoder 30 and/or components thereof may be configured to support temporal scalability of encoded video bitstreams, such as in accordance with HEVC WD9. For instance, video decoder 30 may receive a sub-bitstream that network element 68 extracts from a full encoded video bitstream, and communicates to video decoder 30. In this example, network element 68 may extract a temporal subset of encoded pictures from the full set of encoded pictures included in the full encoded video bitstream, and provide the temporal subset as part of the sub-bitstream to video decoder 30. For example, the temporal subset may represent a true subset of the full set of encoded pictures included in the full encoded video bitstream. In scenarios where the temporal subset represents a true subset of the full set of encoded pictures, the full encoded video bitstream may include data for every encoded picture of the temporal subset, and data for at least one additional encoded picture that is not included in the temporal subset.

To support various temporal picture rates in accordance with temporal scalability, video decoder 30 may be configured to receive and decode sub-bitstreams of varying picture rates, such as various sub-bitstreams that network element 68 may extract from the full encoded video bitstream. More specifically, different sub-bitstreams that include temporal subsets of varying picture counts may represent different picture rates. To support temporal scalability, video decoder 30 may decode any sub-bitstream, regardless of picture rate, as an independently decodable bitstream. In other words, video decoder 30 may decode a particular temporal subset of encoded pictures without any additional data, such as information included in the full encoded video bitstream but excluded from the particular sub-bitstream.

In examples where video decoder 30 receives a full encoded video bitstream signaled by a video encoding device, the full encoded video bitstream may include one or more temporal sub-layers. Additionally, each NAL unit received and/or decoded by video decoder 30 may belong to a specific sub-layer as indicated by a corresponding "TemporalId" value. More specifically, video decoder 30 may determine the value of the TemporalId of a NAL unit to be equal to the value of the signaled corresponding "temporal_id_plus1" syntax element, minus one. Additionally, video decoder 30 may determine that all signaled VCL NAL units of a single picture belong to a single sub-layer (i.e., the same sub-layer). In other words, video decoder 30 may decode an encoded picture, based on a determination that the encoded picture itself belongs to the particular sub-layer corresponding to the NAL units associated with the encoded picture.

For example, in accordance with HEVC WD9, video decoder 30 may decode a signaled encoded video bitstream, such that a decoding process of a lower sub-layer of the bitstream is not dependent on data in a higher sub-layer of the bitstream. Network element 68 may generate a sub-bitstream from a full bitstream, by removing, from the full bitstream, all NAL units associated with a TemporalId value that is higher than a specific value. The video encoding device may ensure that all conditions for bitstream conformance (e.g., buffer restrictions) with respect to HEVC WD9, are fulfilled with respect to the full bitstream, and therefore, for each sub-bitstream that network element 68 may extract from the full bitstream. In turn, video decoder 30 may decode any signaled sub-bitstream without any changes to the decoding process, and without necessitating any changes to hardware and/or software infrastructure. In other words, video decoder 30 may decode a signaled sub-bitstream, while supporting temporal scalability in accordance with HEVC WD9, in a manner that corresponds to decoding a full encoded video bitstream.

As described, in temporally scaling a full encoded video bitstream, network element 68 may extract a temporal subset of encoded pictures from the full encoded video bitstream. More specifically, the temporal subset may be a true subset of the encoded pictures signaled in the full encoded video bitstream, and therefore, network element 68 may remove one or more encoded pictures from the full encoded bitstream to generate the sub-bitstream. In examples, network element 68 may remove one or more encoded pictures that are included in a progressive refinement segment. Video decoder 30 may potentially receive an incorrect value of the num_refinement_steps_minus1 syntax element. By decoding and potentially applying an incorrect value of the num_refinement_steps_minus1 syntax element, video decoder 30 may apply the progressive refinement operation to decode pictures that are positioned after the ending bound of the temporally scaled progressive refinement segment.

To mitigate or eliminate erroneous decoding of pictures that are positioned after the end of the progressive refinement segment in the encoded video bitstream, video decoder 30 and/or components thereof, such as entropy decoding unit 70, may implement one or more techniques of this disclosure. According to some implementations of the techniques, video decoder 30 may decode the progressive refinement segment start SEI message to obtain information that indicates the picture order count (POC) value of the last picture of the progressive refinement segment. The POC value may represent a static value that is associated with a particular encoded picture signaled in the encoded video bitstream, and thus, may identify the particular encoded picture to video decoder 30, regardless of any temporal scaling of the encoded video bitstream.

For instance, by deriving the POC value of the last encoded picture of the progressive refinement segment, video decoder 30 may more accurately identify the last encoded picture of the progressive refinement segment. More specifically, video decoder 30 may identify the last encoded picture of the progressive refinement segment, regardless of whether video decoder 30 has received a temporally scaled progressive refinement segment. In examples where video decoder 30 receives a temporally scaled progressive refinement segment, video decoder 30 may accurately identify the last picture of the progressive refinement segment, regardless of the extent to which the progressive refinement segment has been temporally scaled. In other words, video decoder 30 may identify the last encoded picture (i.e., the ending bound) of the progressive refinement segment, regardless of the picture rate of the received encoded video bitstream.

According to various implementations of the techniques described herein, video decoder 30 may decode a progressive refinement segment start SEI message to obtain information that video decoder 30 may use to determine the POC value associated with the last encoded picture of the progressive refinement segment. In one implementation, video decoder 30 may decode the progressive refinement segment start SEI message to obtain data indicating a "delta POC" value. More specifically, the delta POC value may indicate a difference between the POC value of the base picture and the POC value of the last encoded picture of the progressive refinement segment.

In turn, video decoder 30 may use the progressive refinement segment start SEI message to detect the starting bound (e.g., the first encoded picture) of a corresponding progressive refinement segment. Additionally, video decoder 30 may determine the ending bound (e.g., the last encoded picture) of the progressive refinement segment by applying the delta POC value to the POC value of the base picture (e.g., the encoded picture that immediately precedes the starting bound, in decoding order). For example, by applying the delta POC value to the POC value of the base picture, video decoder 30 may derive the POC value of the ending bound of the progressive refinement segment.

As described, the POC value of a particular encoded picture may be a static value associated with the encoded picture, and may indicate the position of the encoded picture in decoding order. By obtaining data from which to derive the POC value of the ending bound of the progressive refinement segment, video decoder 30 may determine the ending bound of the progressive refinement segment, irrespective of whether, and by what magnitude, network element 68 temporally scales the progressive refinement segment. Video decoder 30 may decode the progressive refinement segment start SEI message to obtain the delta POC value from a "pic_order_cnt_delta" syntax element, as illustrated in syntax table 3 above. In this manner, video decoder 30 may implement one or more techniques of this disclosure to decode a progressive refinement sequence using a corresponding progressive refinement operation, while supporting temporal scalability of encoded video bitstreams.

According to some implementations in which video decoder 30 decodes the progressive refinement segment start SEI message to obtain data associated with the POC value of the ending bound of the progressive refinement segment, video decoder 30 may obtain a delta of least significant bits (LSBs) from the decoded progressive refinement segment start SEI message. In these implementations, video decoder 30 may use the delta of LSBs to determine a difference between the LSB value of the POC value of the base picture, and LSB value of the POC value of the last encoded picture of the progressive refinement segment.

In turn, video decoder 30 may use the delta of LSBs to derive the POC value of the ending bound of the progressive refinement segment. More specifically, video decoder 30 may apply the delta of LSBs to the LSB of the POC value of the base picture. In one example, video decoder 30 may decode the progressive refinement segment start SEI message to obtain a syntax element indicating the delta of LSBs, instead of the "num_refinement_steps_minus1" syntax element.

By obtaining the syntax element that indicates the delta of LSBs, video decoder 30 may determine the ending bound of the progressive refinement segment, irrespective of whether, and by what magnitude, network element 68 temporally scales the progressive refinement segment. For example, video decoder 30 may apply the value of the decoded syntax element to derive the POC value of the ending bound of the progressive refinement segment. Video decoder 30 may use the derived POC value to identify the ending bound using a static value associated with the ending bound, when decoding the progressive refinement segment. In this manner, video decoder 30 may implement one or more techniques of this disclosure to decode a progressive refinement sequence using a corresponding progressive refinement operation, while supporting temporal scalability of encoded video bitstreams.

According to other implementations of the techniques described herein, video decoder 30 may decode the progressive refinement segment start SEI message to obtain data indicating the number of consecutive encoded pictures that 1)

are associated with a TemporalId value that is less than or equal to the TemporalId value of the base picture, and 2) represent progressive quality refinements of the base picture. More specifically, a decreasing TemporalId value may indicate an advancement in the encoded video bitstream, according to decoding order. For instance, the first encoded picture of the progressive refinement segment may have a TemporalId value that is less than the TemporalId value of the base picture. In turn, the second encoded picture of the progressive refinement segment may have a TemporalId value that is less than the TemporalId of the first encoded picture of the progressive refinement segment, and so on.

The base picture may be the encoded picture included in the current access unit, and the base picture may immediately precede the first encoded picture of the progressive refinement segment in decoding order. In some examples, the base picture may also immediately precede the first encoded picture of the progressive refinement segment in output order. In some such examples, the progressive refinement segment may include a sequence of encoded pictures that are consecutive in both decoding order and in output order.

According to these implementations of the techniques described herein, video decoder 30 may decode the progressive refinement segment start SEI message to obtain data indicating the number of consecutive encoded pictures that have a TemporalId value less than the TemporalId value of the base picture, as well as represent progressive quality refinements of the base picture. For instance, the information obtained by video decoder 30 may indicate the number of encoded pictures in the sequence that makes up the progressive refinement segment. In these implementations, video decoder 30 may receive, from network element 68, a number of consecutive encoded pictures that satisfy the conditions listed above. More specifically, network element 68 may determine the number of consecutive encoded pictures satisfying the conditions, separately for each temporal subset of encoded pictures that network element 68 extracts from the full encoded video bitstream. In turn, network element 68 may communicate the number of consecutive encoded pictures that satisfy the conditions listed above, to video decoder 30.

By applying the received number of consecutive encoded pictures that satisfy the above conditions, video decoder 30 may more accurately determine the length of the progressive refinement segment, even in scenarios where network element 68 temporally scales the progressive refinement segment. In turn, video decoder 30 may obtain the number of consecutive encoded pictures that satisfy the conditions as part of the encoded video bitstream, whether or not the encoded video bitstream represents a sub-bitstream (e.g., representing a temporal subset of encoded pictures). In various examples, video decoder 30 may generate the progressive refinement segment start SEI message to obtain a syntax element that indicates the determined number of consecutive encoded pictures that satisfy the above conditions. For instance, video decoder 30 may decode the progressive refinement segment start SEI message to obtain the syntax element indicating the determined number, instead of the num_refinement_steps_minus1 syntax element illustrated in Syntax Table 1 above.

Video decoder 30 may, by obtaining the number of consecutive encoded pictures that have a TemporalId value less than the TemporalId value of the base picture and represent progressive quality refinements of the base picture, more accurately determine the length of the progressive refinement segment. Additionally, by obtaining the information described above, as part of decoding an encoded progressive refinement segment start SEI message, video decoder 30 may accurately determine the length of the progressive refinement segment, regardless of whether network element 68 temporally scales the progressive refinement segment. For instance, video decoder 30 may utilize the syntax element obtained from the progressive refinement segment start SEI message to determine the length of the progressive refinement segment, regardless of whether, or by what magnitude, network element 68 temporally scales the progressive refinement segment. In this manner, video decoder 30 may implement one or more techniques of this disclosure to determine a number of consecutive encoded pictures that 1) have a TemporalId value less than the TemporalId of base picture, and 2) represent progressive quality refinements of the base picture, thereby enabling a video decoding device to decode a progressive refinement segment, while supporting temporally scalable video bitstreams.

As described with respect to FIG. 3, video decoder 30 and/or components thereof may perform a method of decoding video data, the method including receiving information indicating a picture order count (POC) value of a last picture of a plurality of pictures in a progressive refinement segment in an encoded bitstream, and decoding at least some of the pictures in the progressive refinement segment according to a progressive refinement operation based on the received information. In some example implementations of the method described above with respect to video decoder 30, the received information includes a delta POC value that indicates a difference between a POC value of a picture that immediately precedes the progressive refinement segment and the POC value of the last picture of the progressive refinement segment. According to some example implementations of the method described above with respect to video decoder 30, the received information includes a delta of least significant bits (LSBs) that indicates a difference between LSBs of a POC value of a picture that immediately precedes the progressive refinement segment and LSBs of a POC value of the last picture of the progressive refinement segment. In one example of the method described above with respect to video decoder 30, the received information includes a POC value of the last picture of the progressive refinement segment.

According to some implementations of the method described above with respect to video decoder 30, receiving the information comprises receiving the information in a supplemental enhancement information (SEI) message included in the encoded bitstream. In one such implementation, the SEI message comprises a progressive refinement segment start SEI message that indicates a starting bound of the progressive refinement segment. According to some implementations of the method described above with respect to video decoder 30, the method may further include determining that an encoded picture immediately precedes the progressive refinement segment in an encoded video bitstream. In one such implementation, each of the plurality of pictures in the progressive refinement sequence defines a quality refinement in comparison to the encoded picture that immediately precedes the progressive refinement sequence.

In some examples of the method described above with respect to video decoder 30, the method may further comprise detecting the last picture of the plurality of pictures in the progressive refinement segment using the received information, and ceasing decoding according to the progressive refinement operation. According to some implementations of the method described above with respect to video decoder 30, decoding at least some of the pictures in the progressive refinement segment according to the progressive refinement operation based on the received information may comprise applying the progressive refinement operation to each picture in the progressive refinement segment, except for the last picture in the progressive refinement segment.

In various examples, video decoder 30 may be included in a device for coding video data, such as a desktop computer, notebook (i.e., laptop) computer, tablet computer, set-top box, telephone handset such as a so-called "smart" phone, so-called "smart" pad, television, camera, display device, digital media player, video gaming console, video streaming device, or the like. In examples, such a device for coding video data may include one or more of an integrated circuit, a microprocessor, and a communication device that includes video decoder 30.

Figure 4:
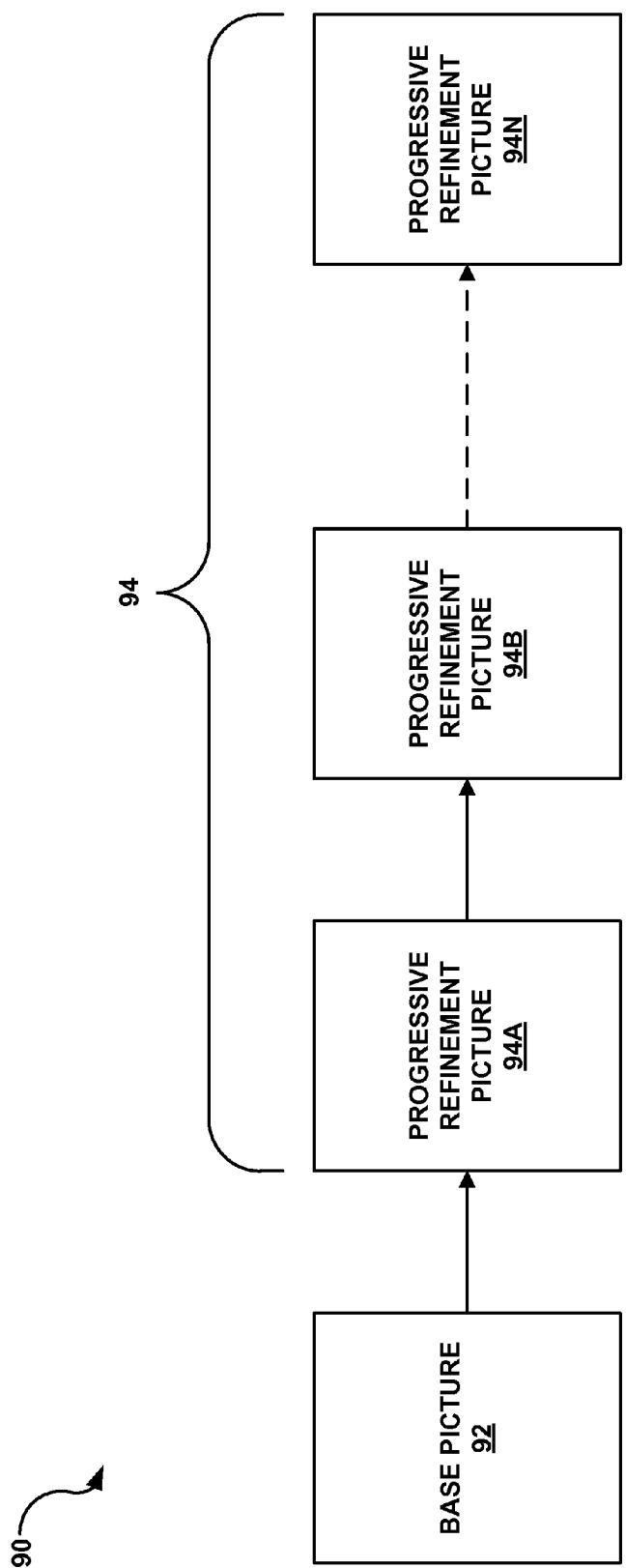
FIG. 4 is a conceptual diagram illustrating an example progressive refinement segment and a corresponding base picture.

FIG. 4 is a conceptual diagram illustrating an example progressive refinement segment 94 and corresponding base picture 92, in accordance with one or more aspects of this disclosure. More specifically, FIG. 4 illustrates picture sequence 90, which includes base picture 92, and progressive refinement segment 94. In turn, progressive refinement segment 94 includes progressive refinement pictures 94A-94N. Each of progressive refinement pictures 94A-94N may represent a quality refinement of base picture 92. In various examples, a quality refinement may, in accordance with this disclosure, represent a refinement in terms of progressively reducing an amount of distortion between a coded picture and an original picture. For instance, each of progressive refinement pictures 94A-94N may include residual data that base picture 92 does not include. Additionally, each of progressive refinement pictures 94A-94N may represent quality refinements of base picture 92, without representing any motion-based prediction from base picture 92.

More specifically, progressive refinement segment 94 may represent a sequence of encoded pictures in consecutive decoding order. In some examples, the sequence of encoded pictures included in progressive refinement segment 94 may also be in consecutive output order. Additionally, progressive refinement segment 94 may represent a continual quality refinement with respect to base picture 92, defined by a per-picture increment. For instance, progressive refinement picture 94A, which is the first picture of progressive refinement segment 94, may represent a quality refinement over base picture 92, by a predefined increment. In turn, progressive refinement picture 94B, which is the second picture of progressive refinement segment 94, may represent a quality refinement over progressive refinement picture 94A, by the predefined increment, and so on. In this manner, progressive refinement segment 94 may represent an iterative quality refinement over base picture 92, with the last encoded picture (progressive refinement picture 94N) representing the cumulative quality refinement across all iterations of the predefined refinement increment.

For instance, video decoder 30 may decode progressive refinement segment 94 by applying a progressive refinement operation to the previous picture in decoding order. More specifically, video decoder 30 may receive a progressive refinement segment start SEI message as part of an encoded video bitstream signaled by video encoder 20. Additionally, video decoder 30 may decode the received progressive refinement segment start SEI message to obtain a value of a progressive_refinement_id syntax element. In turn, video decoder 30 may use the obtained value of the progressive_refinement_id to determine the particular progressive refinement operation with which to decode progressive refinement segment 94. Video decoder 30 may apply the determined progressive refinement operation to base picture 92, and to each picture of progressive refinement segment 94 except for progressive refinement picture 94N (i.e., the last picture). More specifically, video decoder 30 may apply the progressive refinement operation, without applying any motion prediction, to base picture 92 and each picture of progressive refinement segment 94 through the penultimate picture.

Additionally, video decoder 30 may implement one or more techniques of this disclosure to decode progressive refinement segment 94, while supporting temporal scalability of encoded video bitstreams. For instance, video decoder 30 may decode the progressive refinement segment start SEI message to obtain information indicating a picture order count (POC) value of the last picture (e.g., progressive refinement picture 94N) of progressive refinement segment 94. The progressive refinement segment start SEI message may be positioned immediately after encoded data associated with base picture 92, in the encoded video bitstream. The POC value of a particular picture may indicate the position of the particular picture within the encoded video bitstream, regardless of whether the encoded video bitstream is temporally scaled to provide a reduced picture rate. For instance, video decoder 30 may identify an encoded picture by the picture's assigned POC value, without relying on information associated with other portions of a received encoded video bitstream.

In some examples, video decoder 30 may decode a progressive refinement segment start SEI message associated with progressive refinement segment 94 to obtain information indicating the POC value of progressive refinement picture 94N. For instance, video decoder 30 may decode the progressive refinement segment start SEI message to obtain a value of a syntax element included in the SEI message. More specifically, in this instance, video decoder 30 may obtain, from the decoded syntax element, the POC value associated with progressive refinement picture 94N.

In turn, video decoder 30 may decode progressive refinement segment 94 by iteratively applying the progressive refinement operation identified by the value of the progressive_refinement_id syntax element, until video decoder 30 detects the POC value identified by the corresponding syntax element. Upon detecting the POC value identified by the corresponding syntax element of the progressive refinement segment start SEI message, video decoder 30 may determine that video decoder 30 has reached the ending bound of progressive refinement segment 94 (which, in the example of FIG. 4, is denoted by progressive refinement picture 94N). Based on determining that video decoder 30 has reached the ending bound of progressive refinement segment 94, video decoder 30 may cease decoding encoded pictures of the bitstream, based solely on the refinement operation indicated by the progressive_refinement_id syntax element.

According to other implementations of the techniques of this disclosure, video decoder 30 may decode the progressive refinement segment start SEI message to obtain a delta_POC syntax element. Video decoder 30 may use the value of the delta_POC syntax element to determine the POC value of the ending bound of progressive refinement picture 94N, which denotes the ending bound of progressive refinement segment 94. More specifically, video decoder 30 may apply the value of the delta_POC to POC value of base picture 92, to determine the POC value of progressive refinement picture 94N. Video decoder 30 may, in turn, use the determined POC value of progressive refinement picture 94N to detect when, in the decoding process, video decoder 30 has reached the ending bound of progressive refinement segment 94. Based on determining that video decoder 30 has reached the ending bound of progressive refinement segment 94, using the delta_POC value, video decoder 30 may cease decoding according to progressive refinement.

In other example implementations of the techniques described herein, video decoder 30 may decode the progressive refinement segment start SEI message to obtain a syntax element that indicates a delta of least significant bits (LSBs). Video decoder 30 may use the delta of LSBs value to detect progressive refinement picture 94N, during the decoding process with respect to the encoded video bitstream. More specifically, video decoder 30 may apply the delta of LSBs value to the LSB of the POC value of base picture 92, to derive the LSB of the POC value of progressive refinement picture 94N, which forms the ending bound of progressive refinement segment 94.

In turn, video decoder 30 may decode progressive refinement picture 94A solely by applying the refinement operation identified by the progressive_refinement_id syntax element to base picture 92, and continue to decode subsequent pictures in decoding order by continuing to apply the refinement operation, until video decoder 30 identifies a picture associated with a POC value that has the derived LSB value. In one example, video decoder 30 may decode each of progressive refinement pictures 94A-94N by iteratively apply the refinement operation to the immediately preceding picture of progressive refinement segment 94. In another example, video decoder 30 may decode each of progressive refinement pictures 94A-94N by applying the progressive refinement operation, or a variant thereof, to base picture 92. Additionally, upon detecting a picture having a POC value with the derived LSB, video decoder 30 may determine that video decoder 30 has reached the ending bound of progressive refinement segment 94 (i.e., progressive refinement picture 94N) in the decoding process of the encoded video bitstream. Based on determining that video decoder 30 has reached the ending bound of progressive refinement segment 94, using the delta_POC value, video decoder 30 may determine that video decoder 30 has completed decoding of the progressive refinement segment.

Figure 5:
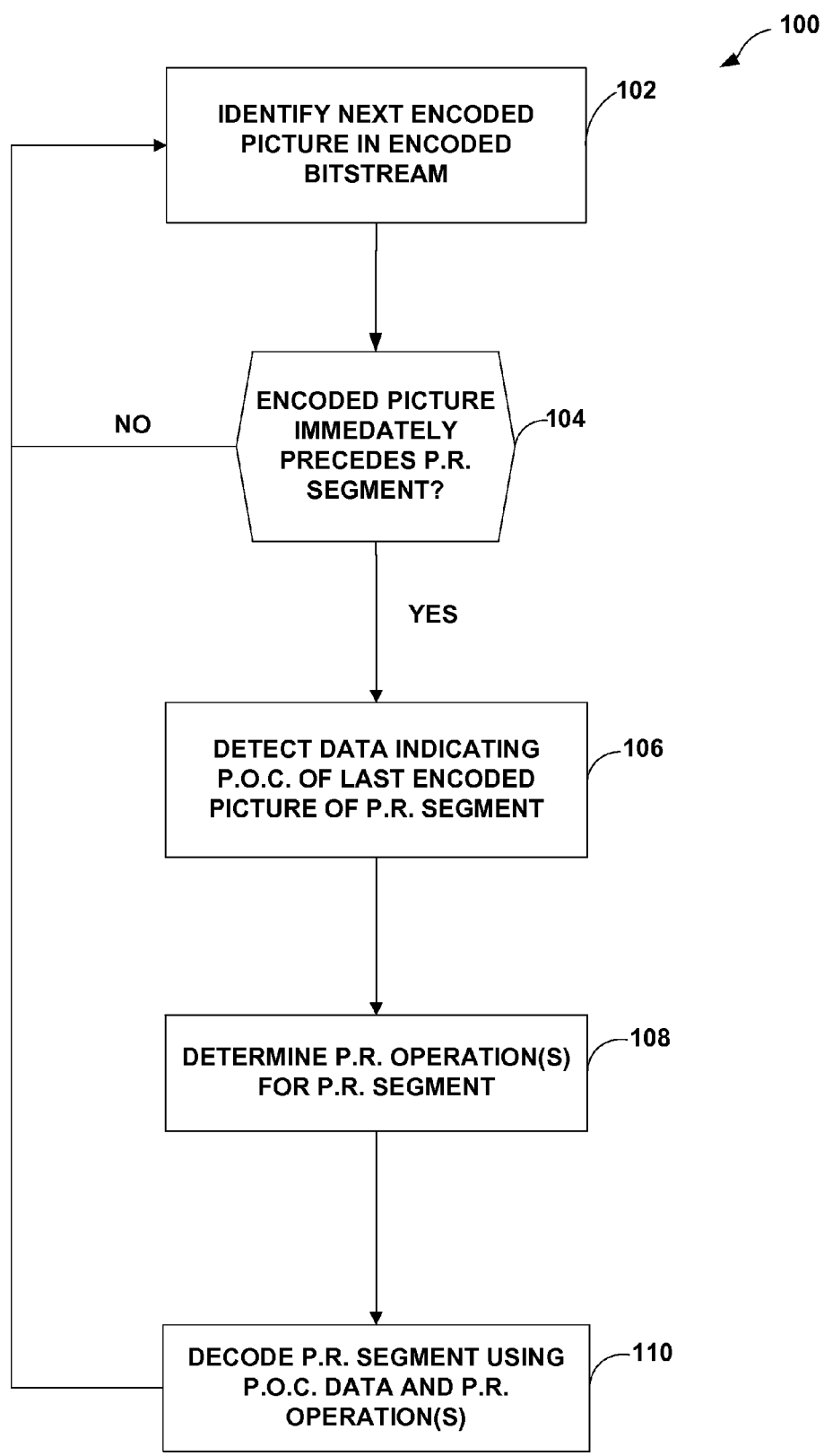
FIG. 5 is a flowchart illustrating an example process that a video decoder and/or components thereof may perform to decode encoded video data with progressive refinement, in accordance with one or more aspects of this disclosure.

FIG. 5 is a flowchart illustrating an example process 100 that video decoder 30 and/or components thereof may perform to decode encoded video data, in accordance with one or more aspects of this disclosure. Process 100 may begin when video decoder 30 identifies a next encoded picture signaled in an encoded video bitstream (102). More specifically, video decoder 30 may detect the next encoded picture according to decoding order, and in some examples, according to output order, signaled in the encoded video bitstream.

Additionally, video decoder 30 may determine whether the identified encoded picture immediately precedes a progressive refinement segment in decoding order (104). More specifically, by determining whether the encoded picture immediately precedes a progressive refinement segment, video decoder 30 may determine whether or not the encoded picture forms a base picture for the progressive refinement segment. For instance, video decoder 30 may determine whether the encoded picture is a base picture, by entropy decoding the encoded picture, and determining whether a progressive refinement segment start SEI message is positioned immediately after the encoded in the encoded video bitstream. If video decoder 30 detects the progressive refinement segment start SEI message positioned immediately after the encoded picture, video decoder 30 may determine that the encoded picture forms the base picture for a progressive refinement segment.

If video decoder 30 determines that the most recently decoded picture is not a base picture for a progressive refinement segment ('NO' branch of 104), video decoder 30 may identify the next encoded picture in decoding order signaled in the encoded video bitstream (effectively returning to 102), and continue the decoding process. On the other hand, if video decoder 30 determines that the most recently decoded picture is the base picture for a progressive refinement segment ('YES' branch of 104), then video decoder 30 may detect data indicating the POC value of the last encoded picture of the progressive refinement segment (106).

In various implementations, video decoder 30 may decode the progressive refinement segment start SEI message to obtain the data indicating the POC value of the last encoded picture of the progressive refinement segment. For instance, video decoder 30 may decode the progressive refinement segment start SEI message to obtain one or more syntax elements that indicate the POC value of the last encoded picture of the progressive refinement segment. In various examples, video decoder 30 may use the syntax element(s) to determine the POC value either directly or indirectly. More specifically, the syntax element(s) may directly indicate the POC value to video decoder 30, or may provide video decoder 30 with data with which to derive the POC value of the last encoded picture in the progressive refinement segment. As one example, video decoder 30 may decode syntax element(s) that indicate one or more of a delta POC value that indicates a difference between the POC values of the base picture and the last encoded picture of the progressive refinement segment. As another example, video decoder 30 may decode syntax element(s) that indicate a delta of LSBs that indicates a difference between the LSBs of the POC values of the base picture and the last encoded picture of the progressive refinement segment.

Additionally, video decoder 30 may determine a progressive refinement operation associated with the progressive refinement segment (108). More specifically, video decoder 30 may decode the progressive refinement segment start SEI message to obtain a progressive_refinement_id syntax element. In turn, video decoder 30 may use the value of the progressive_refinement_id syntax element to identify a progressive refinement operation, which is used to decode the progressive refinement segment. For example, video decoder 30 may, based on the value of the progressive_refinement_id syntax element, decode one or more of progressive refinement pictures 94A-94N by adding residual data to the decoded video data associated with base picture 92.

Video decoder 30 may decode the progressive refinement segment, using the data indicating the POC value of the last picture of the progressive refinement segment, and the identified progressive refinement operation (110). More specifically, video decoder 30 may iteratively apply the identified progressive refinement operation to the base picture, and each following picture in decoding order, until video decoder 30 detects the POC value (or LSB thereof) associated with the last encoded picture of the progressive refinement segment. For example, to iteratively apply the progressive refinement operation, video decoder 30 may determine additional data from each successive encoded picture of the segment, and use the additional data to add to a bit depth of a given picture of the segment. The POC may be a static value that is unaffected by temporal scaling of the encoded video bitstream. As a result, video decoder 30 may use the POC-indicating data and the identified progressive refinement operation to decode the progressive refinement segment according to a progressive refinement operation as defined in HEVC WD9, while also supporting temporally scalable video bitstreams.

Figure 6:
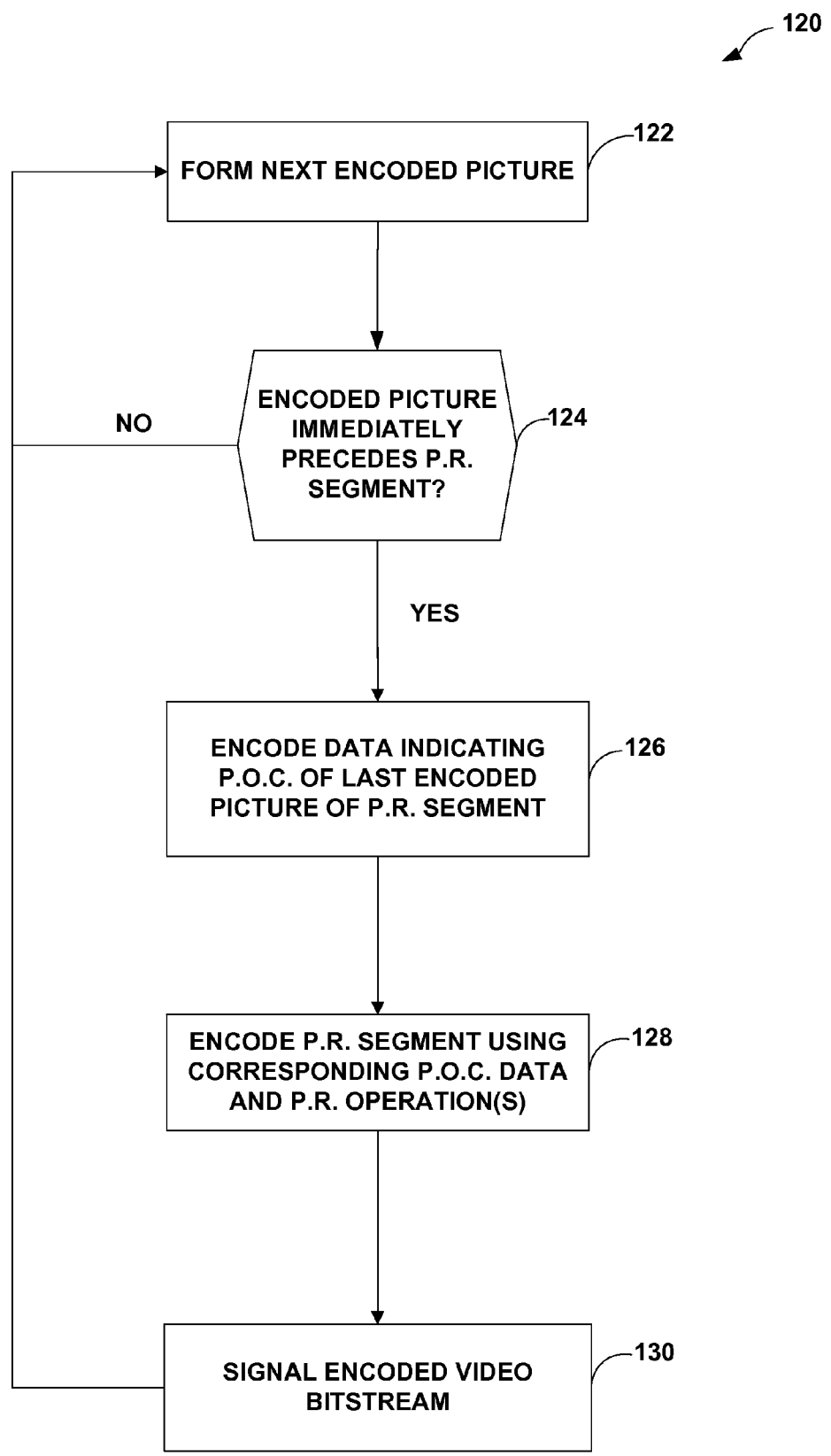
FIG. 6 is a flowchart illustrating an example process that video encoder and/or components thereof may perform to encode video data with progressive refinement, in accordance with one or more aspects of this disclosure.

FIG. 6 is a flowchart illustrating an example process 120 that video encoder 20 and/or components thereof may perform to encode video data, in accordance with one or more aspects of this disclosure. Process 120 may begin when video encoder 20 forms a next encoded picture of a bitstream (122). For instance, video encoder 20 may entropy encode the next picture of received video data, to form the next encoded picture. Additionally, video encoder 20 may determine whether the most recently encoded picture immediately precedes a progressive refinement segment in decoding order (124).

In other words, video encoder 20 may determine whether the most recently encoded picture is a base picture for the progressive refinement segment. Video encoder 20 may determine whether to insert a progressive refinement segment start SEI message before a sequence of pictures that immediately follow the most recently encoded picture in decoding order to define quality refinements with respect to the most recently encoded picture, without defining any motion-prediction with respect to the most recently encoded picture. If video encoder 20 determines that the most recently encoded picture is not a base picture for a progressive refinement segment ('NO' branch of 124), video encoder 20 may form the next encoded picture to be signaled in the encoded video bitstream.

On the other hand, if video encoder 20 determines that the most recently encoded picture is the base picture of a progressive refinement segment, video encoder 20 may encode data indicating a POC value of the last encoded picture of the progressive refinement segment (126). For instance, video encoder 20 may implement techniques of this disclosure to encode progressive refinement segment start SEI message that includes information with which a video decoding device may determine the POC value of the last encoded picture of the progressive refinement segment. In one example, video encoder 20 may include data that directly indicates the POC value of the last encoded picture of the progressive refinement segment, such as in the form of a syntax element. In other examples, video encoder 20 may include data that the video decoding device may use to derive the POC value.

In some examples, video encoder 20 may include a pic_order_cnt_delta syntax element in the progressive refinement segment start SEI message. For instance, video encoder 20 may generate the pic_order_cnt_delta syntax element to indicate a difference between the respective POC values of the base picture and the last encoded picture of the progressive refinement segment. As another example, video encoder 20 may include a syntax element indicating a delta of LSBs in the SEI message. In this example, video encoder 20 may generate the delta of LSBs to indicate a difference between the respective LSBs of the POC values of the base picture and the last encoded picture of the progressive refinement segment. Video encoder 20 may enable a video decoding device to detect the ending bound (i.e. the last encoded picture) of the progressive refinement segment using the values of one or both of the pic_order_cnt_delta or the delta of LSBs syntax elements.

Additionally, video encoder 20 may encode the progressive refinement segment based on the data indicating the POC value of the last encoded picture of the progressive refinement segment, and on a progressive refinement operation associated with the progressive refinement segment. For example, video encoder 20 may encode each picture of the progressive refinement segment by applying the progressive refinement operation to the immediately preceding encoded picture. Video encoder 20 may detect the ending bound of the progressive refinement segment based on detecting the POC value (or LSB thereof) of the last encoded picture of the progressive refinement segment. Based on detecting the ending bound of the progressive refinement segment, video encoder 20 may cease encoding subsequent pictures using solely the progressive refinement operation.

Video encoder 20 may signal the encoded video bitstream. More specifically, video encoder 20 may signal the encoded video bitstream to include data associated with the base picture, the progressive refinement segment start SEI message including one or more of the syntax elements described above, and the progressive refinement segment. In some examples, an intermediate device may extract a sub-bitstream, such as by temporally scaling a full encoded video bitstream. In these examples, because video encoder 20 generates and signals the progressive refinement segment start SEI message to include data indicating the POC value of the ending bound of the progressive refinement segment, video encoder 20 may provide a video decoding device with accurate data by which to decode the segment, irrespective of the temporal scaling. Video encoder 20 may implement techniques of this disclosure to encode, and enable decoding of, progressive refinement segments, while supporting temporal scalability of encoded video bitstreams.

In this manner, either of video decoder 30 or video encoder 20 may be an example of a device for coding video data, the device including means for determining information indicating a picture order count (POC) value of a last picture of a plurality of pictures in a progressive refinement segment in an encoded bitstream, and means for coding at least some of the pictures in the progressive refinement segment according to a progressive refinement operation.

Additionally, in this manner, either of destination device 14 or source device 12 may be an example of a computing device that includes or is coupled to a computer-readable storage medium having stored thereon instructions that, when executed, cause a programmable processor of the computing device to determine information indicating a picture order count (POC) value of a last picture of a plurality of pictures in a progressive refinement segment in an encoded bitstream, and to code at least some of the pictures in the progressive refinement segment according to a progressive refinement operation.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, various computer-readable storage devices, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, in a supplemental enhancement information (SEI) message, a delta picture order count (POC) value that indicates a difference between a POC value of a picture that immediately precedes a plurality of subsequent pictures in a progressive refinement segment in an encoded video bitstream and a POC value of a last picture of the plurality of subsequent pictures in the progressive refinement segment; and
   based on the received delta POC value, decoding at least some of the plurality of subsequent pictures in the progressive refinement segment according to a progressive refinement operation, wherein the progressive refinement operation indicates a refinement with respect to picture quality.

2. The method of claim 1, wherein the SEI message comprises a progressive refinement segment start SEI message that specifies a beginning of the progressive refinement segment.

3. The method of claim 1, further comprising:
   determining that the picture that immediately precedes the plurality of subsequent pictures in the encoded video bitstream comprises a base picture with respect to the progressive refinement segment, the progressive refinement segment refining the base picture.

4. The method of claim 3, wherein each respective picture of the plurality of subsequent pictures in the progressive refinement segment defines a quality refinement in comparison to a picture that immediately precedes the respective picture in the progressive refinement segment.

5. The method of claim 1, further comprising:
   determining the last picture of the plurality of subsequent pictures in the progressive refinement segment using the received delta POC value; and
   ceasing decoding according to the progressive refinement operation.

6. The method of claim 1, wherein decoding at least some of the plurality of subsequent pictures in the progressive refinement segment according to the progressive refinement operation based on the received delta POC value comprises:
   applying the progressive refinement operation to each picture in the progressive refinement segment until decoding a progressive refinement segment end SEI message.

7. A method of encoding video data, the method comprising:
   encoding, according to a progressive refinement operation, at least some pictures of a plurality of subsequent pictures that follow a picture that immediately precedes the plurality of subsequent pictures in a progressive refinement segment, wherein the progressive refinement operation indicates a refinement with respect to picture quality;
   generating a delta picture order count (POC) value that indicates a difference between a POC value of the picture that immediately precedes the plurality of subsequent pictures in the progressive refinement segment in an encoded bitstream and a POC value of a last picture of the plurality of subsequent pictures in the progressive refinement segment in the encoded bitstream; and
   including, in a supplemental enhancement information (SEI) message to be signaled in the encoded video bitstream, the generated delta POC value.

8. The method of claim 7, wherein the SEI message comprises a progressive refinement segment start SEI message that specifies a beginning of the progressive refinement segment.

9. The method of claim 7, further comprising:
   determining that the picture that immediately precedes the plurality of subsequent pictures in the encoded video bitstream comprises a base picture with respect to the progressive refinement segment, the progressive refinement segment refining the base picture.

10. The method of claim 9, wherein each respective picture of the plurality of subsequent pictures in the progressive refinement segment defines a quality refinement in comparison to a picture that immediately precedes the respective picture in the progressive refinement segment.

11. The method of claim 7, further comprising:
    determining the last picture of the plurality of subsequent pictures in the progressive refinement segment; and
    ceasing encoding according to the progressive refinement operation.

12. The method of claim 7, wherein encoding at least some of the plurality of subsequent pictures in the progressive refinement segment according to the progressive refinement operation comprises:

applying the progressive refinement operation to each picture in the progressive refinement segment until encoding a progressive refinement segment end SEI message.

13. A device for decoding video data, the device comprising:
 a memory configured to store at least a portion of the video data; and
 a video decoder configured to:
  determine, based at least in part on a supplemental enhancement information (SEI) message, a delta picture order count (POC) value that indicates a difference between a POC value of a picture that immediately precedes a plurality of subsequent pictures in a progressive refinement segment in an encoded video bitstream and a POC value of a last picture of the plurality of subsequent pictures in the progressive refinement segment in an encoded bitstream; and
  based on the determined delta POC value, decode at least some of the plurality of subsequent pictures in the progressive refinement segment according to a progressive refinement operation, wherein the progressive refinement operation indicates a refinement with respect to picture quality.

14. The device of claim 13, wherein the device comprises at least one of:
 an integrated circuit;
 a microprocessor; or
 a wireless communication device that comprises the video decoder.

15. The device of claim 13, wherein the SEI message comprises a progressive refinement segment start SEI message that specifies a beginning of the progressive refinement segment.

16. The device of claim 13, wherein the video decoder is further configured to:
 determine that the picture that immediately precedes the plurality of subsequent pictures in the encoded video bitstream comprises a base picture with respect to the progressive refinement segment, the progressive refinement segment refining the base picture.

17. The device of claim 16, wherein each respective picture of the plurality of subsequent pictures in the progressive refinement segment defines a quality refinement in comparison to a picture that immediately precedes the respective picture in the progressive refinement segment.

18. The device of claim 13, wherein the video decoder is further configured to:
 determine the last picture of the plurality of subsequent pictures in the progressive refinement segment using the determined delta POC value; and
 cease decoding according to the progressive refinement operation.

19. The device of claim 13, wherein, to decode at least some of the plurality of subsequent pictures in the progressive refinement segment according to the progressive refinement operation, the video decoder is configured to:
 apply the progressive refinement operation to each picture in the progressive refinement segment until decoding of a progressive refinement segment end SEI message.

20. The device of claim 13, wherein the video decoder comprises at least one processor.

21. A non-transitory computer-readable storage medium having stored thereon instructions that, when executed, cause a programmable processor of a video decoding device to:
 determine, based at least in part on a supplemental enhancement information (SEI) message, a delta picture order count (POC) value that indicates a difference between a POC value of a picture that immediately precedes a plurality of subsequent pictures in a progressive refinement segment in an encoded video bitstream and a POC value of a last picture of the plurality of subsequent pictures in the progressive refinement segment in an encoded bitstream; and
 based on the determined delta POC value, decode at least some of the plurality of subsequent pictures in the progressive refinement segment according to a progressive refinement operation, wherein the progressive refinement operation indicates a refinement with respect to picture quality.

22. A device for decoding video data, the device comprising:
 means for determining, based at least in part on a supplemental enhancement information (SEI) message, a delta picture order count (POC) value that indicates a difference between a POC value of a picture that immediately precedes a plurality of subsequent pictures in a progressive refinement segment in an encoded video bitstream and a POC value of a last picture of the plurality of subsequent pictures in the progressive refinement segment in an encoded bitstream; and
 means for decoding, based on the determined delta POC value, at least some of the plurality of subsequent pictures in the progressive refinement segment according to a progressive refinement operation, wherein the progressive refinement operation indicates a refinement with respect to picture quality.

23. A device for encoding video data, the device comprising:
 a memory configured to store at least a portion of the video data; and
 a video encoder configured to:
  encode, according to a progressive refinement operation, at least some pictures of a plurality of subsequent pictures that follow a picture that immediately precedes the plurality of subsequent pictures in a progressive refinement segment, wherein the progressive refinement operation indicates a refinement with respect to picture quality;
  generate a delta picture order count (POC) value that indicates a difference between a POC value of the picture that immediately precedes the plurality of subsequent pictures in the progressive refinement segment in an encoded bitstream and a POC value of a last picture of the progressive refinement segment in the encoded bitstream; and
  include, in a supplemental enhancement information (SEI) message to be signaled in the encoded video bitstream, the generated delta POC value.

24. The device of claim 23, wherein the device comprises at least one of:
 an integrated circuit;
 a microprocessor; or
 a wireless communication device that comprises the video encoder.

25. The device of claim 23, wherein the SEI message comprises a progressive refinement segment start SEI message that specifies a beginning of the progressive refinement segment.

26. The device of claim 23, wherein the video encoder is further configured to:
 determine that the picture that immediately precedes the plurality of subsequent pictures in the progressive refinement segment in the encoded video bitstream comprises a base picture with respect to the progressive refinement segment.

27. The device of claim 26, wherein each respective picture of the plurality of subsequent pictures in the progressive refinement segment defines a quality refinement in comparison to a picture that immediately precedes the respective picture in the progressive refinement segment.

28. The device of claim 23, wherein the video encoder is further configured to:
 determine the last picture of the plurality of subsequent pictures in the progressive refinement segment; and
 cease encoding according to the progressive refinement operation.

29. The device of claim 23, wherein, to encode at least some of the plurality of subsequent pictures in the progressive refinement segment according to the progressive refinement operation, the video encoder is configured to:
 apply the progressive refinement operation to each picture in the progressive refinement segment until encoding of a progressive refinement segment end SEI message.

* * * * *